US012559053B2

(12) United States Patent
Omote et al.

(10) Patent No.: US 12,559,053 B2
(45) Date of Patent: Feb. 24, 2026

(54) CAPACITIVE SEAT SENSOR AND METHODS FOR MAKING AND USING SAME

(71) Applicants: NITTO, INC., Teaneck, NJ (US); NITTO DENKO CORPORATION, Osaka (JP); NITTO BEND TECHNOLOGIES, INC., Farmington, UT (US)

(72) Inventors: Toshihiko Omote, San Jose, CA (US); Benedicto Delos Santos, San Jose, CA (US); Juma Belknap, San Jose, CA (US); John Bortell, San Jose, CA (US); Colton Allen Ottley, Farmington, UT (US); Jared K. Jonas, Farmington, UT (US); Colin D. Eichinger, Farmington, UT (US); Nathan C. Briggs, Farmington, UT (US)

(73) Assignees: NITTO, INC., Teaneck, NJ (US); NITTO DENKO CORPORATION, Osaka (JP); NITTO BEND TECHNOLOGIES, INC., Farmington, UT (US)

( * ) Notice: Subject to any disclaimer, the term of this patent is extended or adjusted under 35 U.S.C. 154(b) by 43 days.

(21) Appl. No.: 18/555,499

(22) PCT Filed: Apr. 13, 2022

(86) PCT No.: PCT/US2022/024712
§ 371 (c)(1),
(2) Date: Oct. 13, 2023

(87) PCT Pub. No.: WO2022/221473
PCT Pub. Date: Oct. 20, 2022

(65) Prior Publication Data
US 2024/0198943 A1 Jun. 20, 2024

Related U.S. Application Data

(60) Provisional application No. 63/174,509, filed on Apr. 13, 2021.

(51) Int. Cl.
*B60R 21/015* (2006.01)
*G01L 1/14* (2006.01)

(52) U.S. Cl.
CPC ........ *B60R 21/01532* (2014.10); *G01L 1/146* (2013.01)

(58) Field of Classification Search
CPC ..... B60R 21/01532; G01L 1/146; G01B 7/22; B60N 2/00; B60N 2210/12
See application file for complete search history.

(56) References Cited

U.S. PATENT DOCUMENTS 4,001,676 A * 1/1977 Hile ...................... G01F 23/266
73/304 C
5,878,620 A * 3/1999 Gilbert ................... G01L 1/205
73/172

(Continued)

FOREIGN PATENT DOCUMENTS

JP 2005-265422 A 9/2005
KR 101229798 B1 5/2013

(Continued)

OTHER PUBLICATIONS

International Search Report and Written Opinion, as issued in connection with International Patent Application No. PCT/US2022/024712, dated Jul. 21, 2022, 12 pgs.

(Continued)

*Primary Examiner* — Robert A. Siconolfi
(74) *Attorney, Agent, or Firm* — MASCHOFF BRENNAN; Paul G. Johnson

(57) ABSTRACT

In an example, a vehicle seat sensor system includes a vehicle seat, a flexible seat sensor, and an electronics unit.

(Continued)

The vehicle seat includes a seat surface. The flexible seat sensor is disposed within a deformable distance from the seat surface and includes one or more signal electrodes, one or more ground electrodes, one or more dielectric layers, and one or more capacitors. Each capacitor is formed by a combination of a corresponding signal electrode and a corresponding ground electrode with a corresponding dielectric layer positioned between the corresponding signal electrode and the corresponding ground electrode. The electronics unit is connected to the flexible seat sensor and is configured to electrically communicate with the flexible seat sensor. The flexible seat sensor is configured to provide a capacitive output proportional to an amount of pressure applied to the flexible seat sensor.

28 Claims, 12 Drawing Sheets

(56) References Cited

U.S. PATENT DOCUMENTS

| | | | | |
|---|---|---|---|---|
| 6,043,743 | A | * | 3/2000 | Saito ................. B60R 21/01532 |
| | | | | 180/271 |
| 7,395,717 | B2 | * | 7/2008 | DeAngelis .............. G01L 1/146 |
| | | | | 73/728 |
| 8,941,281 | B2 | | 1/2015 | Kabata et al. |
| 9,476,692 | B2 | | 10/2016 | Reese |
| 9,874,431 | B2 | | 1/2018 | Reese |
| 2001/0020205 | A1 | * | 9/2001 | Eisenmann ............ B60N 2/003 |
| | | | | 701/45 |
| 2002/0078763 | A1 | * | 6/2002 | Kraetzl .............. G01G 19/4142 |
| | | | | 73/862.68 |
| 2007/0068720 | A1 | * | 3/2007 | Fischer ............ B60R 21/01516 |
| | | | | 177/144 |
| 2008/0180234 | A1 | | 7/2008 | Yamanaka et al. |
| 2009/0295557 | A1 | | 12/2009 | Fischer et al. |
| 2011/0272260 | A1 | * | 11/2011 | Wallace .............. H03K 17/975 |
| | | | | 200/300 |

FOREIGN PATENT DOCUMENTS

| | | |
|---|---|---|
| KR | 101914294 B1 | 2/2018 |
| WO | 0114171 A1 | 1/2001 |
| WO | 2021168286 A1 | 8/2021 |

OTHER PUBLICATIONS

European Office Action, as issued in connection with European Application No. 22720237.1, dated May 22, 2025, 5 pgs.

* cited by examiner

802

804

Right Back

Center

CAPACITIVE SEAT SENSOR AND METHODS FOR MAKING AND USING SAME

CROSS-REFERENCE TO RELATED APPLICATIONS

This application claims priority to and the benefit of United States utility patent application no. 63/174,509, filed Apr. 13, 2021, entitled CAPACITIVE SEAT SENSOR AND METHOD FOR MAKING SAME, which is incorporated herein in its entirety.

FIELD

The present disclosure is related to a capacitive seat sensor and methods for making and using the same.

BACKGROUND

Unless otherwise indicated herein, the materials described herein are not prior art to the claims in the present application and are not admitted to be prior art by inclusion in this section.

Some seat sensors use capacitive sensors in a single package, attached to plural points on a vehicle seat, to measure seat deformation at several preselected locations (see U.S. Pat. Nos. 10,131,249; 9,631,987). The measured capacitive outputs in turn are used as inputs to formulas from which quantities such as occupant presence and/or weight are estimated. However, these quantities are described whether or not the seat is occupied, and may not be sensitive enough for determining other seat parameters, such as ascertaining seat posture.

Thus, there is a need for a simultaneous real time vehicle seat sensor system which can provide information on multiple vehicle seat parameters. Thus, there is a need for a seat sensor which can provide information on both strain and bending of a selective area of the vehicle seat locations under varying operating loads. Such a sensor system may be used to achieve a more comprehensive vehicle seat system for use providing increased seat comfort.

SUMMARY

In an example embodiment, a vehicle seat sensor system includes a vehicle seat, a flexible seat sensor, and an electronics unit. The vehicle seat includes a seat surface. The flexible seat sensor is disposed within a deformable distance from the seat surface and includes one or more signal electrodes, one or more ground electrodes, one or more dielectric layers, and one or more capacitors. Each capacitor is formed by a combination of a corresponding signal electrode and a corresponding ground electrode with a corresponding dielectric layer positioned between the corresponding signal electrode and the corresponding ground electrode. The electronics unit is connected to the flexible seat sensor and is configured to electrically communicate with the flexible seat sensor. The flexible seat sensor is configured to provide a capacitive output proportional to an amount of pressure applied to the flexible seat sensor.

In another example embodiment, a method to make a flexible sensor includes removing one or more predetermined regions from a single starting sheet. A remainder portion of the starting sheet includes remainder regions having electrically conductive structures and a dielectric layer that extends continuously across the remainder regions. The electrically conductive structures are all on a same side of the remainder portion of the starting sheet. The method includes sequentially folding the remainder portion of the starting sheet to arrange the remainder regions in a stack in which each electrically conductive structure in a given remainder region is spaced apart from one or more other electrically conductive structures in one or more adjacent remainder regions of the stack by at least one of the dielectric layer in the given remainder region or the dielectric layer in the adjacent remainder region.

In another example embodiment, a method to determine sitting posture of an occupant of a vehicle seat includes charging flexible seat sensors of a vehicle seat sensor system with direct current. The flexible seat sensors are positioned in different locations of a vehicle seat and within a deformable distance from a seat surface of the different locations of the vehicle seat. Each of the flexible seat sensors includes a capacitive sensor, one or more signal electrodes, one or more ground electrodes, and one or more dielectric layers. The method includes receiving occupancy data from each of the flexible seat sensors based on an amount of discharged charge of each flexible seat sensor. The method includes analyzing the occupancy data from the flexible seat sensors to determine a seat posture of the occupant in the vehicle seat.

These and other embodiments are described in greater detail below.

DETAILED DESCRIPTION

"Contiguous," as used herein, means being proximate to or in actual contact.

"Sandwich," as used herein, means to insert or enclose between at least two things of another quality or character.

"Close proximity", as used herein refers to being proximate to or disposed adjacent to.

"Direct electrical connection", as used herein, refers to a physical electrical connection between electrical components, e.g., the ground electrodes with each other, in addition to being in electrical communication with each other through other component elements, e.g., through the intervening electrical component layers.

"Resilient", as used herein, means to deform, compress, bend, twist or rotate an amount and be able to continue to return to the initial or substantially similar shape or morphology.

"Plate", as used herein, means a flat, planar shaped element. It may comprise any kind of material that would allow it to keep the shape.

Figures 1A, 1B, 1C:
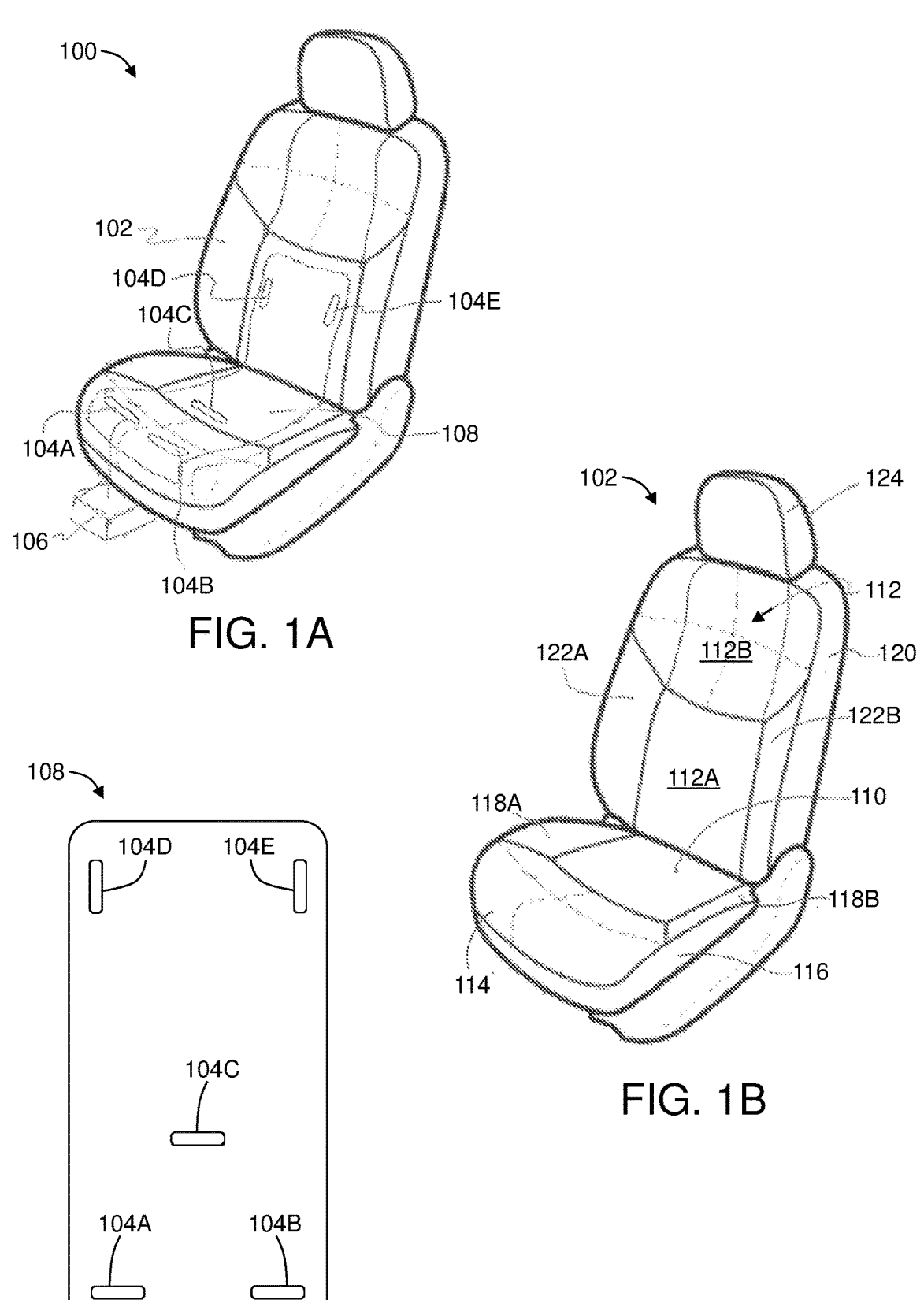
FIG. 1A is a perspective view of an example vehicle seat sensor system.
FIG. 1B is a perspective view of a vehicle seat included in the vehicle seat sensor system of FIG. 1A.
FIG. 1C illustrates an example flexible sensor mat included in the vehicle seat sensor system of FIG. 1A.

FIG. 1A is a perspective view of an example vehicle seat sensor system 100 (hereinafter "system 100"), arranged in accordance with at least one embodiment described herein. The system 100 may include a vehicle seat 102, one or more flexible seat sensors 104A-104E (hereinafter collectively "sensors 104" or generically "sensor 104"), and an electronics unit 106. The one or more flexible seat sensors 104 may be incorporated into a flexible sensor mat 108 as part of the system 100. FIG. 1B is a perspective view of the vehicle seat 102, arranged in accordance with at least one embodiment described herein. FIG. 1C illustrates the flexible sensor mat 108, arranged in accordance with at least one embodiment described herein.

Referring to FIG. 1B, the vehicle seat 102 may include a seat portion 110, a back support portion 112, a leg support portion 114, one or more arm rests (not shown in FIGS. 1A-1B), and/or other portions. The seat portion 110 and the leg support portion 112 may be included in a seat cushion 116. The seat cushion 116 may alternatively or additionally include first and second seat cushion bolsters 118A, 118B (hereinafter collectively "bolsters 118" or generically "bolster 118"). The seat portion 110 may extend from the leg support portion 114 to the back support portion 112 and the bolsters 118 may be positioned on opposite sides of the seat portion 110. The bolsters 118 may act as occupant restraining side portions of the seat cushion 116. The back support portion 112 may include one or both of a lower back or lumbar support portion 112A and an upper back support portion 112B. The back support portion 112 may be included in a back assembly 120 that may be fixed or rotatable, e.g., relative to the seat cushion 116. The back assembly 120 may further include first and second wing portions 122A, 122B (hereinafter collectively "wing portions 122" or generically "wing portion 122"), a headrest 124 extending from the back support portion 112, and/or one or more arm rests (fixed or rotatable) extending from the wing portions 122. The wing portions 122 may act as occupant restraining side portions of the back assembly 120. The vehicle seat 102 may include or be a land vehicle seat, an air travel vehicle seat, a marine vehicle seat, or other vehicle seat.

Referring to FIGS. 1A-1C, the flexible seat sensors 104 may be arranged in one or more desired locations of the vehicle seat 102. For example, as illustrated, the flexible seat sensor 104A is positioned in the leg support portion 114 where the upper right leg of the occupant is expected to be supported. The flexible seat sensor 104B is positioned in the leg support portion 114 where the upper left leg of the occupant is expected to be supported. The flexible seat sensor 104C is positioned in the seat portion 110 where the buttocks of the occupant are expected to be supported. The flexible seat sensors 104D, 104E are positioned in the back support portion 112, specifically in the lumbar portion 112A, toward right and left sides of where the spine of the occupant is expected to be supported.

The flexible seat sensors 104 and/or the flexible sensor mat 108 may be disposed within a deformable distance from a seat surface of the vehicle seat 102. The seat surface may include one or more surfaces of the various components of the vehicle seat 102, such as of the seat portion 110, the back support portion 112, and/or the leg support portion 114. As used herein, a "deformable distance" may include a distance within which force, pressure, strain, or the like on the vehicle seat 102 may be detected by the flexible seat sensor 104. In some embodiments, the deformable distance may be in a range of less than 0.05 millimeters (mm), less than 0.1 mm, less than 1.0 mm, less than 5.0 mm, less than 7.5 mm, less than 10 mm, less than 25 mm, and/or any combination or permutation of the above-described values from the seat surface.

The flexible sensor mat 108 and the flexible seat sensors 104 are visible in FIG. 1A and/or may be disposed on or form part of the seat surface of the vehicle seat 102. In other embodiments, the flexible sensor mat 108 and/or the flexible seat sensors 104 may be positioned beneath and/or behind the seat surface of the vehicle seat 102 such that the flexible sensor mat 108 and/or the flexible seat sensors 104 may not be visible from the exterior of the vehicle seat 102.

The electronics unit 106 may be connected, e.g., electrically and/or communicatively, to each flexible seat sensor 104. The electronics unit 106 may be configured to communicate with each flexible seat sensor 104. Alternatively or additionally, the electronics unit 106 may be configured to charge each flexible seat sensor 104 and/or each of one or more capacitors of each flexible sensor 104 by direct current and calculate a variation of electrostatic capacity of each flexible seat sensor 104 and/or each of the one or more capacitors based on an amount of discharged charge of each flexible seat sensor 104 and/or each of the one or more capacitors.

In some embodiments, the system 100 may be a capacitive sensor system. In some embodiments, the system 100 may be a flexible plate capacitive sensor system. In some embodiments, the system 100 may be a compliant, resilient, and/or deformation sensor system. In some embodiments, the flexible seat sensors 104 may provide a capacitive output proportional to an amount of pressure and/or force applied thereto in one, two, or three dimensions. In some embodiments, each flexible seat sensor 104 may provide a capacitive output proportional to an amount of strain applied thereto. In some embodiments, each flexible seat sensor 104 may provide a capacitive output proportional to the amount of strain and or stress applied thereto. In some embodiments, each flexible seat sensor 104 may provide a capacitive output proportional to vectoral components, e.g., x, y, and z axis components, of the amount of strain and/or stress applied thereto. As used herein, x, y, and z axes define a three-dimensional coordinate system in which the x, y, and z axes are mutually orthogonal to each other.

One or more of the flexible seat sensors 104 may include a flexible plate capacitor construct. In some embodiments, the flexible plate capacitor construct may be sheet shaped. In some embodiments, the flexible plate capacitor construct may be rectangularly shaped. In some embodiments, the flexible plate capacitor construct may comprise a signal electrode, a ground electrode, and an interposed dielectric layer. In some embodiments, the signal electrode, the ground electrode, and the dielectric layer may be in electrical communication with each other. In some embodiments, the signal electrode, the ground electrode, and the dielectric layer may be in selective electrical communication with each other, e.g., in electrical communication upon exceeding a capacitance threshold of the flexible plate capacitor construct by resilient construction and/or deformation of the dielectric layer. In some embodiments, the dielectric layer may be sandwiched between the signal electrode and the ground electrode. In some embodiments, the dielectric layer may be contiguous with the signal electrode. In some embodiments, the dielectric layer may be contiguous with the ground electrode. In some embodiments, the dielectric layer may be in physical contact with the ground and/or the signal electrode. In some embodiments, the flexible plate capacitor construct may include one or more signal electrodes, one or more ground electrodes, and one or more dielectric layers. In some embodiments, at least one of the signal electrodes may be in physical communication with at least one of the dielectric layers. In some embodiments, at least one of the ground electrodes may be disposed outside and/or on an opposite side of the dielectric layer from the signal electrode and in physical communication with an outer surface of the dielectric layer. In some embodiments, the flexible plate capacitor construct may be disposed within a deformable distance from a seat surface. In some embodiments, the flexible plate capacitor construct may provide a capacitive output proportional to the amount of three-dimensional pressure, stress and/or strain applied to the flexible plate capacitor construct.

In some embodiments, the system 100 may include one or more adhesives or other couplers or fasteners to bind the flexible seat sensors 104, the flexible sensor mat 108, the electronics unit 106, and/or other elements to corresponding desired location(s) within the vehicle seat 102 cavity or exterior seat surface of the vehicle seat 102. In some embodiments, the adhesive is a thermoplastic adhesive.

Figure 2:
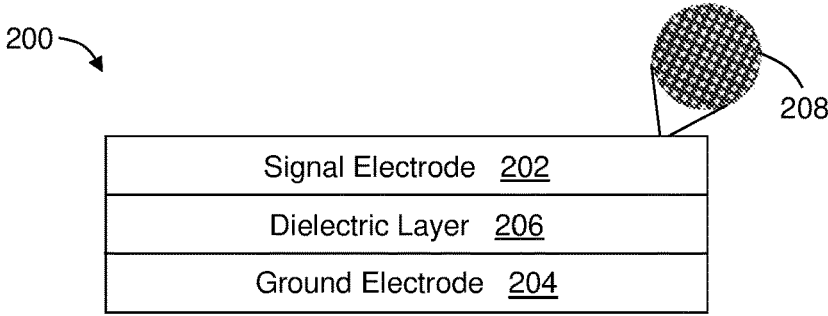
FIG. 2 is a schematic illustration of an example flexible seat sensor that may be included in a vehicle seat sensor system.

FIG. 2 is a schematic illustration of an example flexible seat sensor 200, arranged in accordance with at least one embodiment described herein. The flexible seat sensor 200 may include, be included in, or correspond to other flexible seat sensors herein. For example, one or more of the flexible seat sensors 104 may have a same, similar, or different configuration as the flexible seat sensor 200 of FIG. 2.

In general, the flexible seat sensor 200 may include a signal electrode 202 or signal electrode layer, a ground electrode 204 or ground electrode layer, and an interposed dielectric layer 206 arranged between the signal electrode 202 and the ground electrode 204. Accordingly, the flexible seat sensor 200 may be considered or referred to as a three-layer flexible seat sensor. Each of the signal electrode 202, the ground electrode 204, and the dielectric layer 206 may have a Young's modulus of 0.1 gigapascals (GPa) or less. In other embodiments, the Young's modulus of one or more of the signal electrode 202, the ground electrode 204, and/or the dielectric layer 206 may be greater than 0.1 GPa.

In some embodiments, one or both of the signal electrode 202 or the ground electrode 204 includes conductive material and/or conductive particles (e.g., nanoparticles, such as carbon black, nickel nanostrands, silver nanoparticles, graphene nanoplatelets, graphene-oxides, or the like) integrated within, formed on, or formed in an elastomeric substrate or layer such as silicone that may be included together with the signal electrode 202 or the ground electrode 204 in a corresponding signal electrode layer or ground electrode layer. For example, the conductive material and/or conductive particles may be printed on the elastomeric substrate or layer. As used herein, the term "conductive" without other modifier (e.g., electrically, thermally) refers to electrical conductivity, i.e., the conductive material and/or conductive particles are electrically conductive material and/or electrically conductive particles. In an example, the elastomeric substrate or layer is the dielectric layer 206 and one or both of the signal electrode 202 or the ground electrode 204 is formed or positioned on opposite sides of the dielectric layer 206.

The conductive material and/or conductive particles of the signal electrode 202 and/or the ground electrode 204 may be distributed continuously throughout or on the elastomeric substrate or layer and/or may be arranged thereon or therein to define one or more apertures in the signal electrode 202 and/or the ground electrode 204. For example, the conductive material and/or conductive particles may be arranged in a hatched, mesh, or grid pattern or structure that defines the apertures. A detail view of such a hatched, mesh, or grid pattern or structure is indicated at 208 in FIG. 2.

Although not illustrated in FIG. 2, one or both of the signal electrode 202 or the ground electrode 204 may include or be coupled to a printed circuit board (PCB) interface and/or one or more conductive trace pads for attaching electrical traces, a PCB, or other electronics of or in a corresponding electronics unit for operation and control of the flexible seat sensor 200.

The dielectric layer 206 may include an elastomeric material such as silicone or the like. In some embodiments, the dielectric layer 206 may have some conductive material integrated within depending upon, among other things, an intended or desired amount of permittivity or the like.

In some embodiments, the ground electrode 204 may be coupled to electrical ground (e.g., of an electronics unit) and may thus be referred to as a ground electrode. The signal electrode 202 and the ground electrode 204 with the interposed dielectric layer 206 may form a capacitor.

Figure 3A:
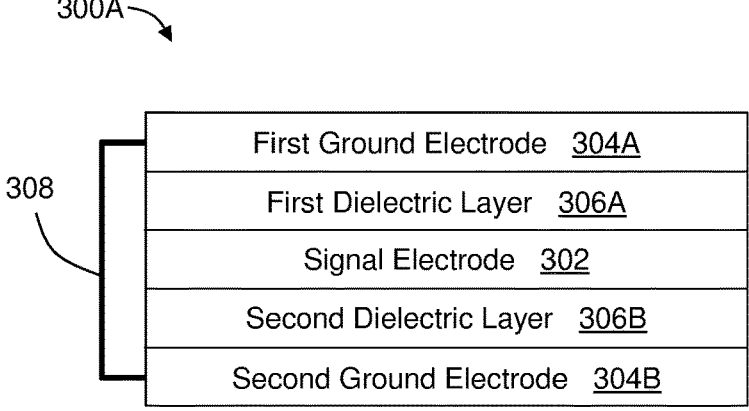
FIG. 3A is a schematic illustration of another example flexible seat sensor that may be included in a vehicle seat sensor system.

FIG. 3A is a schematic illustration of another example flexible seat sensor 300A, arranged in accordance with at least one embodiment described herein. The flexible seat sensor 300A may include, be included in, or correspond to other flexible seat sensors herein. For example, one or more of the flexible seat sensors 104 may have a same, similar, or different configuration as the flexible seat sensor 300A of FIG. 3A.

In general, the flexible seat sensor 300A may include a signal electrode 302 or signal electrode layer, a first ground electrode 304A or first ground electrode layer, a second ground electrode 304B or second ground electrode layer, and interposed first and second dielectric layers 306A, 306B respectively arranged between the signal electrode 302 and a corresponding one of the first ground electrode 304A and the second ground electrode 304B. Accordingly, the flexible seat sensor 300A may be considered or referred to as a five-layer flexible seat sensor. As illustrated, the first dielectric layer 306A is interposed between the signal electrode 302 and the first ground electrode 304A and the second dielectric layer 306B is interposed between the signal electrode 302 and the second ground electrode 304B. Each of the signal electrode 302, the first ground electrode 304A, the second ground electrode 304B, the first dielectric layer 306A, and the second dielectric layer 306B may have a Young's modulus of 0.1 gigapascals (GPa) or less. In other embodiments, the Young's modulus of one or more of the signal electrode 302, the first and second ground electrodes 304A, 304B and/or the first and second dielectric layers 306A, 306B may be greater than 0.1 GPa.

In some embodiments, one or more of the signal electrode 302, the first ground electrode 304A, or the second ground electrode 304B includes conductive material and/or conductive particles (e.g., nanoparticles, such as carbon black, nickel nanostrands, silver nanoparticles, graphene nano-platelets, graphene-oxides, or the like) integrated within, formed on, or formed in an elastomeric substrate or layer such as silicone that may be included together with the signal electrode 302 or the first or second ground electrode 304A, 304B in a corresponding signal electrode layer or ground electrode layer. For example, the conductive material and/or conductive particles may be printed on the elastomeric substrate or layer. In some embodiments, the elastomeric substrate or layer on or in which the signal electrode 302 and/or the first ground electrode 304A is/are formed is the first dielectric layer 306A. In some embodiments, the elastomeric substrate or layer on or in which the signal electrode 302 and/or the second ground electrode 304A is/are formed is the second dielectric layer 306B.

The conductive material and/or conductive particles of the signal electrode 302, the first ground electrode 304A, and/or the second ground electrode 304B may be distributed continuously throughout or on the corresponding elastomeric substrate or layer and/or may be arranged thereon or therein to define one or more apertures in the signal electrode 302, the first ground electrode 304A, and/or the second ground electrode 304B. For example, the conductive material and/or conductive particles may be arranged in a hatched, mesh, or grid pattern or structure that defines the apertures. A detail view of such a hatched, mesh, or grid pattern or structure is indicated at 208 in FIG. 2.

In some embodiments, the first and second signal electrodes 304A, 304B are electrically coupled to each other, e.g., by a direct electrical connector 308. The direct electrical connector 308 may include one or more electrical traces, a perimeter electrode, and/or other conductive structure electrically coupling the first and second ground electrodes 304A, 304B together. In this and other embodiments, positioning the signal electrode 302 between the first and second ground electrodes 304A, 304B and directly electrically connecting the first and second ground electrodes 304A, 304B together may form a Faraday cage around the signal electrode 302. The Faraday cage around the signal electrode 302 may electrically isolate the signal electrode 302 from a surrounding environment to improve signal to noise ratio (SNR) of signals generated and output by the flexible sensor 300A.

Although not illustrated in FIG. 3A, one or more of the signal electrode 302, the first ground electrode 304A, and/or the second ground electrode 304B may include or be coupled to a printed circuit board (PCB) interface and/or one or more conductive trace pads for attaching electrical traces, a PCB, or other electronics of or in a corresponding electronics unit for operation and control of the flexible seat sensor 300A.

The first and second dielectric layers 306A, 306B may include an elastomeric material such as silicone or the like. In some embodiments, the first and second dielectric layers 306A, 306B may have some conductive material integrated within depending upon, among other things, an intended or desired amount of permittivity or the like.

In some embodiments, the first and second ground electrodes 304A, 304B may be coupled to electrical ground (e.g., of an electronics unit) and may thus be referred to as ground electrodes. The signal electrode 302 and the first ground electrode 304A with the interposed first dielectric layer 306A may form a first capacitor in the flexible seat sensor 300A. The signal electrode 302 and the second ground electrode 304B with the interposed second dielectric layer 306B may form a second capacitor in the flexible seat sensor 300A.

Figure 3B:
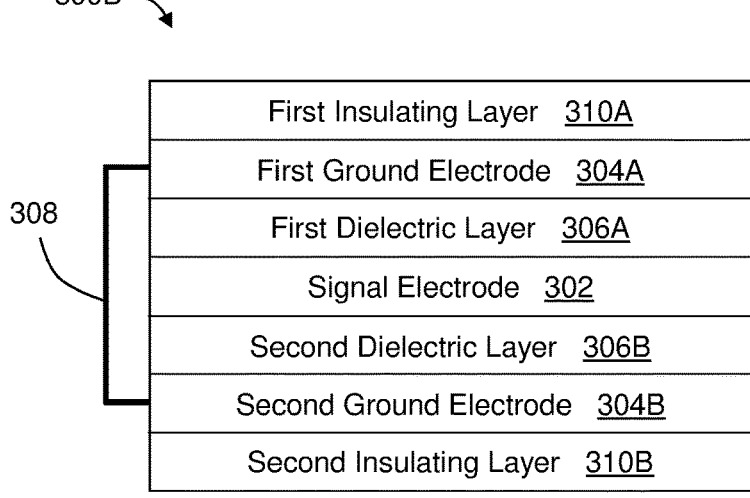
FIG. 3B is a schematic illustration of another example flexible seat sensor that may be included in a vehicle seat sensor system.

FIG. 3B is a schematic illustration of another example flexible seat sensor 300B, arranged in accordance with at least one embodiment described herein. The flexible seat sensor 300B may include, be included in, or correspond to other flexible seat sensors herein. For example, one or more of the flexible seat sensors 104 may have a same, similar, or different configuration as the flexible seat sensor 300B of FIG. 3B.

The flexible seat sensor 300B includes the same elements in the same arrangement as the flexible seat sensor 300A of FIG. 3A, including the signal electrode 302, the first ground electrode 304A, the second ground electrode 304B, the first dielectric layer 306A disposed between the signal electrode 302 and the first ground electrode 304A, the second dielectric layer 306B disposed between the signal electrode 302 and the second ground electrode 304B, and the direct electrical connector 308 electrically coupling the first and second signal electrodes 304A, 304B together.

The flexible seat sensor 300B of FIG. 3B further includes a first insulating layer 310A disposed on or coupled to an outer surface of the first ground electrode 304A and a second insulating layer 310B disposed on or coupled to an outer surface of the second ground electrode 304B. Accordingly, the flexible seat sensor 300B may be considered or referred to as a seven-layer flexible seat sensor. As used herein, the term "insulating" without other modifier (e.g., electrically, thermally) refers to electrical insulation, i.e., the first and second insulating layers 310A, 310B are electrically insulating layers. The first and second insulating layers 310A, 310B may protect the first and second ground electrodes 304A, 304B from unwanted contact with other objects, surfaces, or the like and/or may electrically insulate the first and second ground electrodes 304A, 304B from an external environment. In like manner, the flexible seat sensor 200 of FIG. 2 may include first and second insulating layers disposed on or coupled to outer surfaces of the signal electrode 202 and the ground electrode 204.

Figure 4:
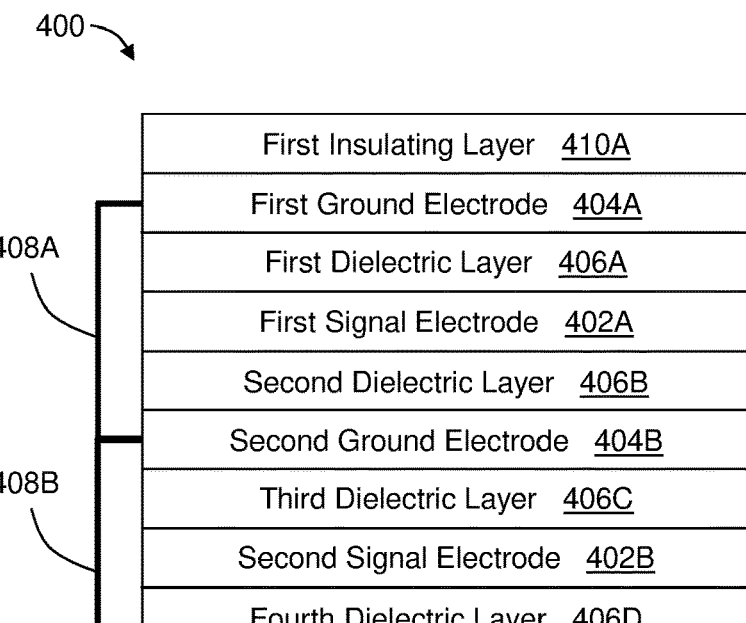
FIG. 4 is a schematic illustration of another example flexible seat sensor that may be included in a vehicle seat sensor system.

FIG. 4 is a schematic illustration of another example flexible seat sensor 400, arranged in accordance with at least one embodiment described herein. The flexible seat sensor 400 may include, be included in, or correspond to other flexible seat sensors herein. For example, one or more of the flexible seat sensors 104 may have a same, similar, or different configuration as the flexible seat sensor 400 of FIG. 4.

In general, the flexible seat sensor 400 may include a first signal electrode 402A or first signal electrode layer, a second signal electrode 402B or second signal electrode layer, a first ground electrode 404A or first ground electrode layer, a second ground electrode 404B or second ground electrode layer, a third ground electrode 404C or third ground electrode layer, and interposed first, second, third, and fourth dielectric layers 406A, 406B, 406C, 406D. The first dielectric layer 406A is interposed between the first signal electrode 402A and the first ground electrode 404A. The second dielectric layer 406B is interposed between the first signal electrode 402A and the second ground electrode 404B. The third dielectric layer 406C is interposed between the second signal electrode 402B and the second ground electrode 404B. The fourth dielectric layer 406D is interposed between the second signal electrode 402B and the third ground electrode 404C.

Each of the first and second signal electrodes 402A, 402B, the first, second, and third ground electrodes 404A-404C, and the first, second, third, and fourth dielectric layers 406A-406D may have a Young's modulus of 0.1 gigapascals (GPa) or less. In other embodiments, the Young's modulus of one or more of the first and second signal electrode 402A, 402B, the first, second, and third ground electrodes 404A-404C, and the first, second, third, and fourth dielectric layers 406A-406D may be greater than 0.1 GPa.

In some embodiments, one or more of the first signal electrode 402A, the second signal electrode 402B, the first ground electrode 404A, the second ground electrode 404B, or the third ground electrode 404C includes conductive material and/or conductive particles (e.g., nanoparticles, such as carbon black, nickel nanostrands, silver nanoparticles, graphene nanoplatelets, graphene-oxides, or the like) integrated within, formed on, or formed in an elastomeric substrate or layer such as silicone that may be included together with the first signal electrode 402A, the second signal electrode 402B, the first ground electrode 404A, the second ground electrode 404B, or the third ground electrode 404C in a corresponding signal electrode layer or ground electrode layer. For example, the conductive material and/or conductive particles may be printed on the elastomeric substrate or layer. In some embodiments, the elastomeric substrate or layer on or in which the first signal electrode 402A and/or the first ground electrode 404A is/are formed is the first dielectric layer 406A. In some embodiments, the elastomeric substrate or layer on or in which the first signal electrode 402A and/or the second ground electrode 404A is/are formed is the second dielectric layer 406B. In some embodiments, the elastomeric substrate or layer on or in which the second signal electrode 402B and/or the second ground electrode 404B is/are formed is the third dielectric layer 406C. In some embodiments, the elastomeric substrate or layer on or in which the second signal electrode 402B and/or the third ground electrode 404C is/are formed is the fourth dielectric layer 406D.

The conductive material and/or conductive particles of the first signal electrode 402A, the second signal electrode 402B, the first ground electrode 404A, the second ground electrode 404B, and/or the third ground electrode 404C may be distributed continuously throughout or on the corresponding elastomeric substrate or layer and/or may be arranged thereon or therein to define one or more apertures in the first signal electrode 402A, the second signal electrode 402B, the first ground electrode 404A, the second ground electrode 404B, and/or the third ground electrode 404C. For example, the conductive material and/or conductive particles may be arranged in a hatched, mesh, or grid pattern or structure that defines the apertures. A detail view of such a hatched, mesh, or grid pattern or structure is indicated at 208 in FIG. 2.

In some embodiments, the first and second signal electrodes 404A, 404B are electrically coupled to each other, e.g., by a first direct electrical connector 408A. In some embodiments, the second and third signal electrodes 404B, 404C are electrically coupled to each other, e.g., by a second direct electrical connector 408B. The first and/or second direct electrical connectors 408A, 408B may include one or more electrical traces, a perimeter electrode, and/or other conductive structure electrically coupling the first and second ground electrodes 404A, 404B and/or the second and third ground electrodes 404B, 404C together. In this and other embodiments, positioning the first signal electrode 402A between the first and second ground electrodes 404A, 404B, positioning the second signal electrode 402B between the second and third ground electrodes 404B, 404C, directly electrically connecting the first and second ground electrodes 404A, 404B together, and directly electrically connecting the second and third ground electrodes 404B, 404C together may form Faraday cages around the first and second signal electrodes 402A, 402B. The Faraday cages around the first and second signal electrodes 402A, 402B may electrically isolate the first and second signal electrodes 402A, 402B from a surrounding environment to improve signal to noise ratio (SNR) of signals generated and output by the flexible sensor 400.

The flexible seat sensor 400 of FIG. 4 further includes a first insulating layer 410A disposed on or coupled to an outer surface of the first ground electrode 404A and a second insulating layer 410B disposed on or coupled to an outer surface of the third ground electrode 404B. Accordingly, the flexible seat sensor 400 may be considered or referred to as an eleven-layer flexible seat sensor. In some embodiments, the first and second insulating layers 410A, 410B may be disposed upon and contiguous with the first and third ground electrodes 404A, 404C. The first and second insulating layers 410A, 410B may protect the first and third ground electrodes 404A, 404B from unwanted contact with other objects, surfaces, or the like and/or may electrically insulate the first and third ground electrodes 404A, 404C from an external environment. Alternatively, one or both of the first or second insulating layers 410A, 410B may be omitted, resulting in a ten- or nine-layer flexible seat sensor.

Although not illustrated in FIG. 4, one or more of the first signal electrode 402A, the second signal electrode 402B, the first ground electrode 404A, the second ground electrode 404B, and/or the third ground electrode 404C may include or be coupled to a PCB interface and/or one or more conductive trace pads for attaching electrical traces, a PCB, or other electronics of or in a corresponding electronics unit for operation and control of the flexible seat sensor 400.

The first, second, third, and fourth dielectric layers 406A-406D may include an elastomeric material such as silicone or the like. In some embodiments, one or more of the first, second, third, or fourth dielectric layers 406A-406D may have some conductive material integrated within depending upon, among other things, an intended or desired amount of permittivity or the like.

In some embodiments, the first, second, and third ground electrodes 404A-404C may be coupled to electrical ground (e.g., of an electronics unit) and may thus be referred to as ground electrodes. The first signal electrode 402A and the first ground electrode 404A with the interposed first dielectric layer 406A may form a first capacitor in the flexible seat sensor 400. The first signal electrode 402A and the second ground electrode 404B with the interposed second dielectric layer 406B may form a second capacitor in the flexible seat sensor 400. The second signal electrode 402B and the second ground electrode 404B with the interposed third dielectric layer 406C may form a third capacitor in the flexible seat sensor 400. The second signal electrode 402B and the third ground electrode 404C with the interposed fourth dielectric layer 406D may form a fourth capacitor in the flexible seat sensor 400.

As illustrated in FIGS. 3A-4, in some embodiments, the signal electrode 302 or the first signal electrode 402A may be in electrical communication with the first dielectric layer 306A, 406A and the second dielectric layer 306B, 406B. In some embodiments, the first dielectric layer 306A, 406A and the second dielectric layer 306B, 406B may be disposed upon and/or contiguous with the signal electrode. In some embodiments, the signal electrode 302 or the first signal electrode 402B may be sandwiched between the first dielectric layer 306A, 406A and the second dielectric layer 306B, 406B. In some embodiments, the first dielectric layer 306A, 406A and the second dielectric layer 306B, 406B may be in electrical communication with the first ground electrode 304A, 404A and the second ground electrode 304B, 404B, respectively. In some embodiments, the first dielectric layer 306A, 406A and the second dielectric layer 306B, 406B may be positioned proximal to and/or inside the first ground electrode 304A, 404A and the second ground electrode 304B, 404B. In some embodiments, the first ground electrode 304A, 404A and the second ground electrode 304B, 404B may be contiguous with and/or disposed upon the first dielectric layer 306A, 406A and the second dielectric layer 306B, 406B, respectively. In some embodiments, the first dielectric layer 306A, 406A and the second dielectric layer 306B, 406B may be sandwiched between the signal electrode 302 or the first signal electrode 402A and the first and second ground electrodes 304A, 304B, 404A, 404B, respectively. In some embodiments, the first and second ground electrodes 304A, 304B, 404A, 404B are in direct electrical contact with each other. In some embodiments, the direct electrical connector 308 or the first direct electrical connector 408A directly connects the first and second ground electrodes 304A, 304B, 404A, 404B. As shown in FIG. 3B, in some embodiments, the first and second ground electrodes 304A, 304B may be respectively sandwiched between the first or second insulating layer 3310A, 310B and the first or second dielectric layer 306A, 306B. The first and second insulating layers 310A, 310B, 410A, 410B may (1) protect the first ground electrode layer 304A, 404A and second or third ground electrode layer 304B, 404C from mechanical damage, and/or (2) improve bonding of the flexible seat sensor 300B, 400 to a sensor mat and/or a vehicle seat location, e.g., a seat surface or seat interior. For example, the first and second insulating layers 310A, 310B, 410A, 410B may be silicone elastomer, a modified silicone rubber elastomer, and/or additional dielectric layer material. In some embodiments, the additional dielectric layer has different capacitive characteristics than the material of the first and second dielectric layers 306A, 306B, 406A, 406B (and/or of the third and fourth dielectric layers 406C, 406D).

In some embodiments, the flexible seat sensors 200, 300A, 300B, 400 may include interposed layers (not shown) which are sheets with moduli higher than the moduli of material used for the conductive and dielectric layers. Such interposed layers may provide vertical separation between two capacitors (vertical gap), ideally forcing the capacitors to be on opposite sides of a neutral plane. By definition, the neutral plane can be a plane where the plane is neither in compression nor extension. The vertical gap can increase sensitivity of sensor bending deformation.

In some embodiments, the signal electrodes 202, 302, 402A, 402B and/or the ground electrodes 204, 304A, 304B, 404A, 404B, 404C may include metallized polymers, conductive inks on the surface of the dielectric layers 206, 306A, 306B, 406A-406C, metallic foils, conductive fillers, e.g., nickel-nanostrands or the like. In some embodiments, the ground electrodes 204, 304A, 304B, 404A, 404B, 404C may include an intermittent regular pattern disposed upon corresponding surfaces of the dielectric layers 306A, 306B, 406A-406C. As shown in FIG. 2 at 208, each of the signal electrodes 202, 302, 402A, 402B and/or the ground electrodes 204, 304A, 304B, 404A, 404B, 404C may include conductive material or particles arranged in a grid pattern in which dark areas include the conductive material or particles and the light areas are non-conductive areas devoid of conductive material or particles. In some embodiments, the grid pattern may be a diagonal pattern relative an axis of the flexible seat sensor 200, 300A, 300B, 400. In some embodiments, the diagonal pattern may be a cross-hatching pattern of intersecting lines and/or regularly spaced dots or incomplete lines.

In some embodiments, each electrode layer (signal electrode layer(s), ground electrode layer(s)) may include a polymer matrix with conductive material or particles disposed therein or thereupon. In some embodiments, the polymer may be a soft thermoplastic polymer. In some embodiments, the thermoplastic polymer is more deformable than the vehicle seat it is disposed upon and/or within. In some embodiments, the soft thermoplastic polymer may be a silicone polymer. In some embodiments, the conductive material or particles may be deposited upon or created in the polymer matrix. In some embodiments, the conductive material or particles may be discrete layers or elements deposited upon or created in the polymer matrix. In some embodiments, the conductive material or particles may be dispersed within or throughout the polymer matrix. In some embodiments, each electrode layer includes conductive nano-particles disposed within a silicone polymer matrix. In some embodiments, each electrode layer may have substantially uniform amounts of conductive material or particles throughout the electrode layer. In some embodiments, an amount of conductive material or particles and/or polymer matrix materials may be removed or not made in selective areas.

In some embodiments, each of the flexible seat sensors 200, 300A, 300B, 400 may include an anisotropic material, the anisotropic material oriented to reduce flexing or deformation in a desired dimension, e.g., lateral flexing or cupping. In some embodiments, the anisotropic material may be mechanically anisotropic. In some embodiments, a layer of anisotropic material is applied to the flexible seat sensor 200, 300A, 300B, 400 to reduce flexing in the desired reduced flexing dimension. In some embodiments, the flexible seat sensor 200, 300A, 300B, 400 may include an anisotropic material to affect a reduction of capacitive activity in orthogonal dimensions, e.g., stretching in the y direction in a flexible seat sensor having its longitudinal dimension in the x direction. In some embodiments, each flexible seat sensor 200, 300A, 300B, 400 may include a mechanically anisotropic material, the mechanically anisotropic material aligned with a lower modulus axis of the anisotropic material aligned along a length of the flexible seat sensor 200, 300A, 300B, 400. In some embodiments, each flexible seat sensor 200, 300A, 300B, 400 may include a mechanically anisotropic material, the mechanically anisotropic material aligned with a higher modulus axis of the anisotropic material aligned along a width of the flexible seat sensor 200, 300A, 300B, 400.

In some embodiments, the anisotropic material may be stretched polyvinylidene fluoride (PVDF). In some embodiments, the longitudinal dimension of the anisotropic material (the perceived axis of reduced deformation) may be aligned and/or parallel to a dimension of the flexible seat sensor 200, 300A, 300B, 400 perceived to exhibit a higher deformation or desired measured deformation.

In some embodiments, the dielectric layers 206, 306A, 306B, 406A-406D may be resilient, distensible, and/or compressible. In some embodiments, the dielectric layers 206, 306A, 306B, 406A-406D include silicone foam material, rubber material, synthetic rubber material, neoprene, polyurethane foam, and polytetrafluoroethylene (PTFE) foam. Each dielectric layer 206, 306A, 306B, 406A-406D may be resilient, generally non-conductive, and not lose its elasticity after repeated compressions and expansions. In some embodiments, the dielectric layers 206, 306A, 306B, 406A-406D may include air pockets therein, such as in a silicone foam material.

Positioned contiguously on either side of each dielectric layer, e.g., dielectric layers 206, 306A, 306B, 406A-406D, and sandwiching the dielectric layer 206, 306A, 306B, 406A-406D therebetween are a corresponding signal electrode 202, 302, 402A, 402B and a corresponding ground electrode 204, 304A, 304B, 404A-404C. An adhesive (not shown) may be used to keep the signal electrodes 202, 302, 402A, 402B and the ground electrodes 204, 304A, 304B, 404A-404C in close contact with the corresponding dielectric layers 206, 306A, 306B, 406A-406D. In another embodiment, the respective layers and electrodes may be continuously joined to one another in a reel-to-reel manufacturing process. In another embodiment, the respective layers and electrodes may be conjoined by a heat press.

In some embodiments, the same or different dielectric materials used in the dielectric layers 206, 306A, 306B, 406A-406D may be used in the insulating layers 310A, 310B, 410A, 410B. In some embodiments, the insulating layers 310A, 310B, 410A, 410B may include a silicone elastomer or a modified silicone elastomer. In some embodiments, the insulating layers 310A, 310B, 410A, 410B may be disposed upon and/or contiguously contacting the corresponding signal electrode 202 or ground electrodes 204, 304A, 304B, 404A, 404C.

Figure 5:
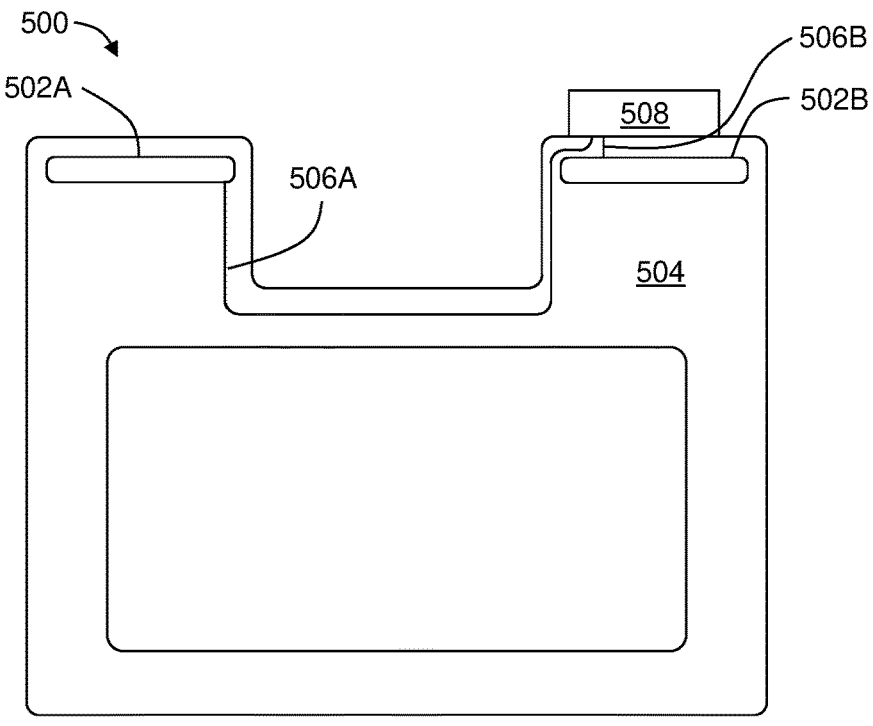
FIG. 5 is a schematic illustration of another example flexible sensor mat that may be implemented in a vehicle seat sensor system.

FIG. 5 is a schematic illustration of another example flexible sensor mat 500 that may be implemented in a vehicle seat sensor system, arranged in accordance with at least one embodiment described herein. The flexible sensor mat 500 may include, be included in, or correspond to other flexible sensor mats herein. For example, the flexible sensor mat 108 may have a same, similar, or different configuration as the flexible sensor mat 500 of FIG. 5.

The flexible sensor mat 500 may include one or more flexible seat sensors 502A, 502B (hereinafter collectively "flexible seat sensors 502" or generically "flexible seat sensor 502"). Each flexible seat sensor 502 may include one or more signal electrodes, one or more ground electrodes, one or more dielectric layers, and/or one or more insulating layers as described elsewhere herein. As shown in FIG. 5, the flexible sensor mat 500 may include a flexible substrate 504. In general, the flexible substrate 504 may include an elastomeric material such as silicon or the like. The flexible substrate 504 may include at least one resilient portion (not shown) and at least one rigid portion (not shown). The resilient portion may include soft elastomer, e.g., silicone elastomer and/or silicone foam. The rigid portion may include a molded elastomer, e.g., a silicone elastomer. In some embodiments, the rigid portion may be vertically aligned with the flexible seat sensors 502 or portions thereof.

The flexible sensor mat 500 may further include electrical traces 506A, 506B that electrically connect the flexible seat sensor sensors 502 to an electronics unit 508. The electronics unit 508 may include, be included in, or correspond to other electronics units herein. The electronics unit 508 may be in electrical communication with each flexible seat sensor 502 (e.g., via the electrical traces 506A, 506B) and may measure the capacitance of each flexible seat sensor 502 to sense change in spatial distance or compression of the respective capacitors. The electronics unit 508 may be configured to ascertain or provide a signal proportionate to the distance between or compression of the respective capacitors. In some embodiments, such proportionate signal may be used to determine the positioning of an occupant of a vehicle seat with which the flexible sensor mat 500 is implemented, posture of the occupant when used in conjunction with angular displacement or stress applied to the seat portion based on the measured capacitance, or other parameters.

In some embodiments, any or all of the above-described layers and/or electrodes may be resilient. By resilient is meant that the described layer or electrode may substantially return to original dimensions upon release or removal of pressure or tension that distorts or distends the described layers and/or electrodes. In some embodiments, any or all of the above-described layers and/or electrodes may be flexible. In some embodiments, the layers and/or electrodes may be concurrently distensible in multiple directions. In some embodiments, the layers and/or electrodes may be concurrently distensible in response to multiple forces, e.g., yaw (x), roll (y), and/or pitch (z) forces or combinations thereof. In some embodiments, the layers and/or electrodes may be concurrently distensible in response to multiple forces or forces with components along multiple axes, e.g., three dimensional forces disposed along the x, y and/or z axes, or combinations thereof. In some embodiments, the layers and/or electrodes may be compressible and/or expandable, e.g., a thickness of a given layer or electrode may decrease or increase as a result of forces exerted upon the layer or electrode and/or a distance between and/or along one or more signal electrodes, ground electrodes, or dielectric layers may decrease or increase. In some embodiments, the layers and/or electrodes may be compressible and/or expandable, e.g., a length, width and/or lateral dimensions of each layer and/or electrode may decrease or increase as a result of forces or x, y or z components thereof, exerted upon the layer and/or electrode and/or the distance between lateral positions of electrodes may decrease or increase. In some embodiments, the layers and/or electrodes may be differentially compressed based on a distance of each from the vehicle seat surface. Such differential compression from the same application of seat compression, i.e., the same person sitting in the seat at one moment of real time, may provide differing capacitive outputs that allow for determination of angle of inclination, seat posture, etc.

As indicated elsewhere, each flexible seat sensor herein may include one or more capacitors, each formed by a signal electrode spaced apart from a ground electrode by a dielectric layer. The electrodes may maintain conductivity and respond measurably to small and large deformations responsive to small and large stretches and/or strains. Each capacitor may be represented by or approximated as a parallel plate capacitor with a capacitance c that may be determined or calculated according to equation 1:

$$c = k\varepsilon_0 A/D. \qquad \text{Equation 1}$$

In equation 1, k is relative permittivity, $\varepsilon_0$ is the permittivity of free space, A is the area of the electrodes, and D is the thickness of the dielectric layer or distance between the two electrodes. Therefore, the generated capacitance of each capacitor may be a function of the thickness of the dielectric layer or the distance between the two electrodes. Distension or compression of the capacitor at a particular location of a vehicle seat and the resulting change in distance between the two electrodes of the capacitor may provide a measure of the forces applied to the particular location of the seat.

Strain and stretch describe how things elastically deform. Strain $\varepsilon$ is a measure of how much an object is stretched or deformed and is equal to a change in length of the object divided by an original length of the object. Thus, strain E may be described according to equation 2:

$$\in = (l - L_0)/L_0. \qquad \text{Equation 2}$$

In equation 2, l is a total length of the object and Lo is an original length of the object. Stretch, or particularly stretch ratio $\lambda$, is a measure of extensional or normal strain of an object. The stretch ratio $\lambda$ may be described according to equation 3:

$$\lambda = l/L_0. \qquad \text{Equation 3}$$

The term strain may be used to describe small deformation (e.g., metal rod under tension), while stretch may be used to describe a larger deformation (e.g., rubber band under tension). Strain may be a three-dimensional measure ($\in x$, $\in y$, $\in z$) or a one-dimensional value, where strain is measured along an axis of tensile strain. In tension, strain is positive. In compression, strain is negative. Stretch and strain may be used synonymously herein, unless otherwise described. When in tensile stretch ($\lambda$) and assuming Poisson's ratio of 0.5 (as elastomers are relatively incompressible), the following capacitance-strain relationship may be described according to equation 4:

$$c(\lambda) = c_0\lambda. \qquad \text{Equation 4}$$

In equation 4, co is the capacitance of the capacitor in the unstrained state, $\lambda$ is stretch (or strain) as defined above, and $c(\lambda)$ is the capacitance under stretch or strain. In some embodiments, $c(\lambda)$ is linear function of strain and is valid for both small and large strains (i.e., for both strain and stretch as defined above.

In some embodiments, each flexible seat sensor may measure strain. In some embodiments, each flexible seat sensor may measure stretch. In some embodiments, at least the data from two flexible seat sensors may be provided. In some embodiments, data may be provided from a laterally disposed flexible seat sensor pair, e.g., a pair of flexible seat sensors arranged parallel to and spaced apart from each other along the x and/or y axes. In some embodiments, data may be provided from a vertically disposed flexible seat sensor pair, e.g., a pair of flexible seat sensors arranged parallel to and spaced apart from each other along the z axis. In some embodiments, data from at least two flexible seat sensors may be used to compute angular displacement. In some embodiments, each flexible seat sensor may measure one or more of strain, stress and/or angular displacement.

Figure 6A:
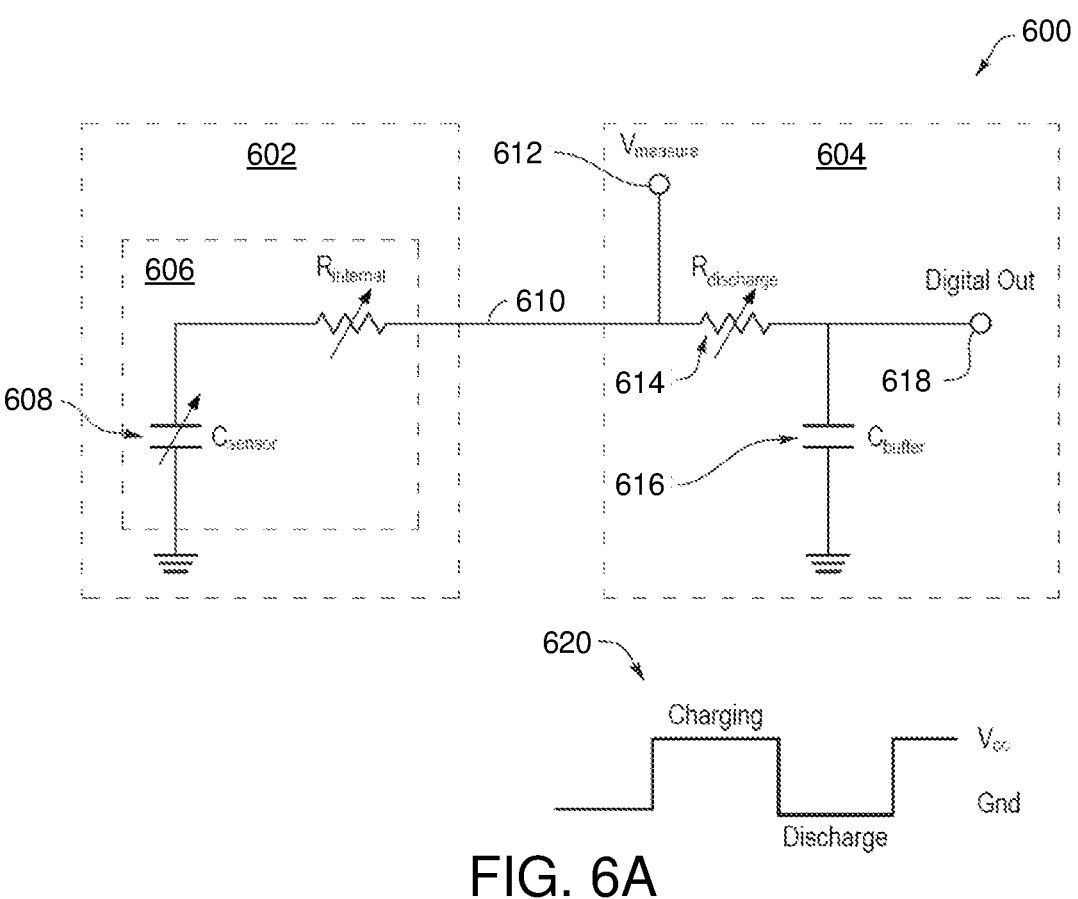
FIG. 6A is a circuit diagram of a portion of an example vehicle seat sensor system.

FIG. 6A is a circuit diagram of a portion of an example vehicle seat sensor system 600 (hereinafter "system 600"), arranged in accordance with at least one embodiment described herein. The system 600 may include, be included in, or correspond to other vehicle seat sensor systems herein. For example, the system 100 may have a same, similar, or different configuration as the system 600 of FIG. 6A.

The portion of the system 600 depicted in FIG. 6A includes a flexible sensor mat 602 and a portion of an electronics unit 604. The flexible sensor mat 602 includes a flexible seat sensor 606 with a capacitor 608. The capacitor 608 has a variable capacitance, or variable electrostatic capacity, $C_{sensor}$ that is variable due to at least deformation of the capacitor 608. In some embodiments, the electrostatic capacity $C_{sensor}$ of the capacitor 608 varies between 60-600 picofarads (pF). The capacitor 608 is electrically coupled to the electronics unit 604 through an electrical trace 610. The flexible seat sensor 606 alone or in combination with the electrical trace 610 may have a variable internal resistance $R_{internal}$.

The electronics unit 604 illustrated in FIG. 6A includes various circuit elements that may be formed on or coupled to, e.g., a PCB (not shown) of the electronics unit 604. In more detail, the electronics unit 604 may include a measurement node 612, a discharge resistor 614 with resistance $R_{discharge}$, a buffer capacitor 616 with electrostatic capacity $C_{buffer}$, and a node 618. The node 618 may be coupled to a digital output pin of a controller which may be included as part of the electronics unit 604 of FIG. 6A.

In general, measurements of the capacitance of the capacitor 608 may be made by charging and discharging the capacitor 608. The capacitor 608 may be charged by direct current (DC) or alternating current (AC).

Measurements made with AC excitation sources may compute complex impedance. Complex impedance may be computed using a combination of operational and instrumentation amplifiers, programmable gate arrays (PGAs), analog-to-digital converters (ADCs), and a Discrete Fourier Transform (DFT). The combination of the hardware power requirements and the computational power requirements of the DFT for complex impedance-based measurements from AC excitation sources may consume a significant amount of power. An example single chip solution for measuring complex impedance from an AC excitation source exhibits typical current consumption of 10 milliamps (mA).

In some embodiments herein, digital charge integration is used to directly measure charge stored on capacitive sensors such as the capacitor 608. An explanation of the technique follows.

Capacitance (c), or electrostatic capacity, is defined as the amount of stored charge (Q) divided by the charging voltage (V) according to Equation 5:

$$c = Q/V. \qquad \text{Equation 5}$$

If the charging voltage is known and the total charge is computed, the capacitance may be measured. FIG. 6A illustrates one circuit for measuring the total charge on the capacitor 608 according to this technique.

In the circuit of FIG. 6A, the capacitor 608 has the variable capacitance $C_{sensor}$ and the variable internal resistance $R_{internal}$ which are both strain dependent. The circuit of FIG. 6A may be driven with a DC square wave 620, e.g., via the node 618, from a controller. In FIG. 6A, the DC square wave 620 has a maximum charging voltage (Vcc) and a discharge to ground (Gnd). The charging current charges the capacitor 608 via a charging current ($i_{charge}$), which may be measured indirectly via a voltage drop over the discharge resistor 614 according to Equation 6:

$$i_{charge} = (Vcc - V_{measure})/R_{discharge}. \qquad \text{Equation 6}$$

In Equation 2, $V_{measure}$ is the voltage at the measurement node 612, which voltage may be measured by a voltage measurement circuit (not shown) of the electronics unit 604 that may be coupled to the measurement node 612. In some embodiments, $V_{measure}$ is provided to an analog input pin of the controller of the electronics unit 604.

The total charge on the capacitor 608 may be found by integrating the measured current across the discharge resistor 614 numerically using the trapezoidal rule, e.g., according to Equation 7:

$$Q = \frac{dt}{2} \sum_{n=1}^{nmax} \left( i_{charge}^{n+1} + i_{charge}^{n} \right). \qquad \text{Equation 7}$$

The capacitance or electrostatic capacity of the capacitor 608 may then be computed (e.g., by the controller of the electronics unit 604) using the total charge and the charging voltage, e.g., using Equation 5.

The use of digital charge integration to determine the capacitance or electrostatic capacity of the capacitor 608, as opposed to traditional complex impedance measurement, eliminates the computationally complex operation of the DFT and the complex analog instrumentation. This leads to a significant reduction in the power consumed when using digital charge integration to determine the capacitance or electrostatic capacity compared to the traditional complex impedance measurement.

Figure 6B:
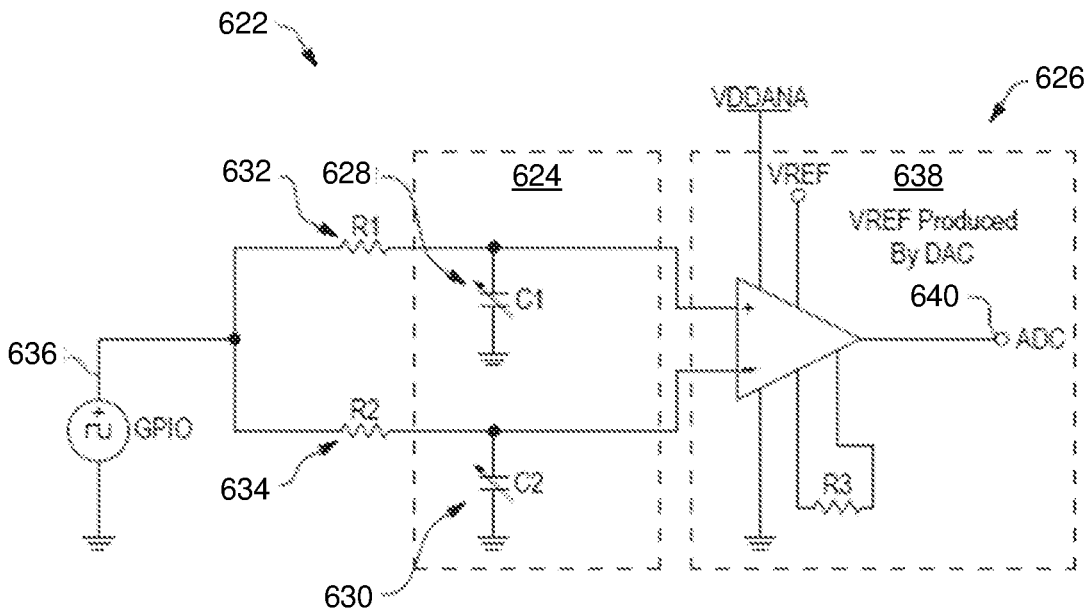
FIG. 6B is a circuit diagram of a portion of another example vehicle seat sensor system.

FIG. 6B is a circuit diagram of a portion of another example vehicle seat sensor system 622 (hereinafter "system 622"), arranged in accordance with at least one embodiment described herein. The system 622 may include, be included in, or correspond to other vehicle seat sensor systems herein. For example, the system 100 may have a same, similar, or different configuration as the system 622 of FIG. 6B. Further, and similar to the system 600 of FIG. 6A, the system 622 of FIG. 6B may be charged and discharged by DC or AC and in some embodiments may be suitable for determining capacitance or electrostatic capacity using digital charge integration.

The portion of the system 622 depicted in FIG. 6B includes a flexible sensor 624 and a portion of an electronics unit 626. The flexible sensor mat 602 may include a flexible seat sensor with two capacitors 628, 630 stacked one on top of the other. Each of the capacitors 628, 630 has a variable electrostatic capacity C1 or C2 that is variable due to at least deformation of the capacitor 628, 630. In some embodiments, the electrostatic capacity $C_{sensor}$ of each of the capacitors 628, 630 varies between about 100-700 pF. Each of the capacitors 628, 630 is electrically coupled through a corresponding front end resistor 632, 634 to an input/output pin 636 of the electronics unit 626. Each of the front end resistors 632, 634 may have a resistance of 330 kilo ohms (kΩ) or other suitable resistance.

The electronics unit 626 illustrated in FIG. 6B includes various circuit elements that may be formed on or coupled to, e.g., a PCB. As illustrated, the electronics unit 626 may include a controller 638, such as a SAML21 or ATSAML21 microcontroller, supplied by Microchip Technology, or other suitable controller.

The controller 638 may include three operational amplifiers (opamps). The opamps may be configured via software to form an instrumentation amplifier, with programmable gain, without the use of external components or routing. An analog front end of the system 622 of FIG. 6B may include the two resistors 632, 634 having respective resistance of R1, R2, the flexible sensor mat 624 having the flexible seat sensor (or multiple flexible seat sensors) with stacked capacitors 628, 630, the opamps (such as SAML21 opamps), and a digital-to-analog converter (DAC) (such as a SAML21 DAC).

The front-end resistors 632, 634 may convert a current supplied through the input/output pin 636 to charge the capacitors 628, 630 into voltage, and the instrumentation amplifier of the controller 638 may convert a differential signal from the capacitors 628, 630 into a single-ended voltage. The output of the instrumentation amplifier is internally routed to an ADC of the controller 638, e.g., via node 640. The ADC performs digital integration by accumulating samples from the output of the instrumentation amplifier.

Figure 7:
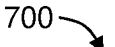
FIG. 7 is a schematic of a portion of another example vehicle seat sensor system.
Figure 7:
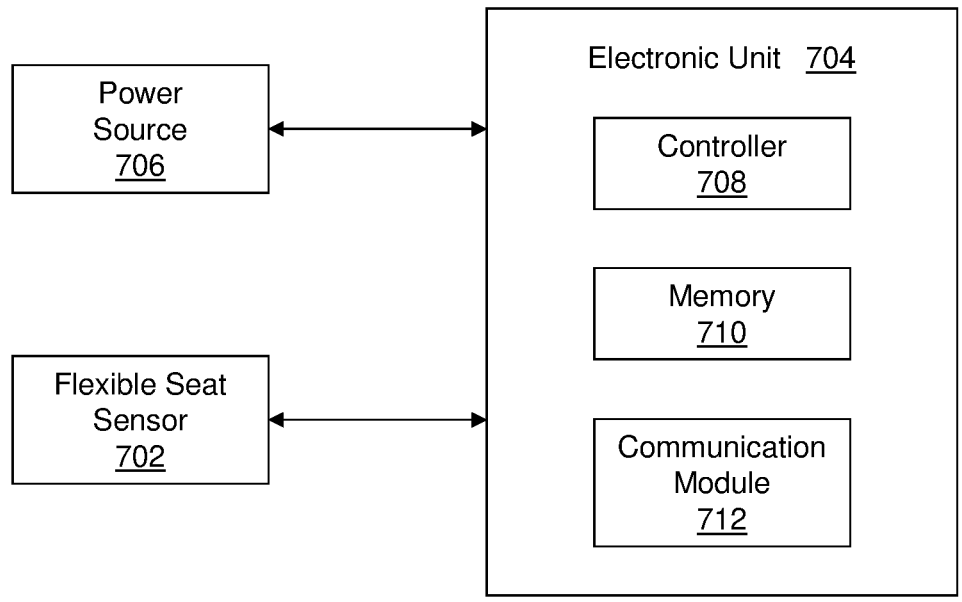

FIG. 7 is a schematic of a portion of another example vehicle seat sensor system 700 (hereinafter "system 700"), arranged in accordance with at least one embodiment described herein. The system 700 may include, be included in, or correspond to other vehicle seat sensor systems herein. For example, the systems 100, 600, 622 may have a same, similar, or different composition and/or configuration as the system 700 of FIG. 7.

As illustrated in FIG. 7, the system 700 may include a flexible seat sensor 702 and an electronics unit 704 and optionally an electric power source 706. The electronics unit 704 may be connected to the flexible seat sensor 702 and the electric power source 706. The flexible seat sensor 702 and the electronics unit 704 may respectively include, be included in, or correspond to the flexible seat sensor 104 and electronics unit 106 and/or other flexible seat sensors or electronics units.

The flexible seat sensor 702 may generally include a capacitor. In some embodiments, the capacitor and/or the flexible seat sensor 702 may be flexible, extensible, distensible, deformable, layered, and/or lamellar.

The power source 706 may include a battery, an energy generating circuit, an energy harvesting system (EHS) module, a dielectric elastomer generating material, a piezoelectric generating material, and/or a receiver coil and circuitry of an inductive charging unit.

The electronics unit 704 may be in electrical communication with each of the flexible seat sensor 702 and the power source 706 via one or more corresponding electrical connectors, such as electrical traces. In some embodiments, the electronics unit 704 may include a controller 708, a memory 710, and/or a communication module 712. The controller 708 may be operably coupled to each of the memory 710 and the communication module 712 and may generally be configured to control operation of the system 700. For example, the electronics unit 704 generally and the controller 708 specifically may be configured to perform or control performance of operations including charging each capacitor of the system 700, calculating a variation of electrostatic capacity of each capacitor on discharged charge amount during discharge of each capacitor, and/or estimating at least one vehicle seat parameter based on the electrostatic capacity and/or the variation of the electrostatic capacity. In some embodiments, the controller 708 may estimate, compare and/or otherwise analyze one or more vehicle seat parameters. In some embodiments, the vehicle seat parameters may include one or more of weight, occupant positioning, occupant posture, variable occupant contact, variable occupant applied pressure (differential pressure/contact applied to distinct regions of the vehicle seat), and/or other vehicle seat parameters.

In some embodiments in which the system 700 includes multiple flexible seat sensors 702, the controller 708 may selectively receive occupant data from any or all of the flexible seat sensors 702 or portions thereof. This may facilitate vehicle seat parameter analysis while the vehicle is in motion and/or under the stress of acceleration or deceleration or turning. The memory may store information relating to the parameter measurements from the flexible seat sensors described herein. The memory 710 may store data generated by the flexible seat sensor 702 (e.g., raw measurement data or signal), data generated by the controller 708 (e.g., calculated electrostatic capacity or variation of electrostatic capacity, or estimated vehicle seat parameter(s)), and/or other data.

Incorporation of an in-sensor computing element, e.g., the controller 708, may reduce the amount of raw data, such as strain and angular displacement data, that may be sent to an external or remote device. This may reduce memory and energy consumption for wireless transmission to the external or remote device and may decrease feedback latency. In some embodiments, the controller 708 may selectively reduce the sampling frequency of the generated capacitance of at least one flexible seat sensor 702. In some embodiments, the sampling frequency may be increased or decreased in proportion to vehicle speed, deceleration, and or duration of a vehicle trip. In some embodiments, the controller 708 may selectively utilize capacitive output from specifically located flexible seat sensors 702 to facilitate seat surface or interior displacement/angular displacement determination of selected vehicle seat portions.

In some embodiments, one or multiple vehicle seats of a vehicle each includes one or more systems 700 and each of the systems 700 may transmit its data to an on-board computer of the vehicle that, while on the same vehicle, is nevertheless a remote device with respect to each of the systems 700. The on-board computer may generate alarms or other notifications to a driver and/or other occupants of the vehicle based on the data received from the system(s) 700, store the data, perform further processing on the data, report the data to a fleet or vehicle management system, or perform some other operations on, with, or based on the data. In some embodiments, each system 700 may be connected (e.g., networked) to the external or remote system or device in a Local Area Network (LAN), an intranet, an extranet, or the Internet. The external or remote system or device may operate in the capacity of a server or a client machine in a client-server network environment, or as a peer machine in a peer-to-peer (or distributed) network environment. Each system 700 may include or be in communication with a personal computer (PC), a tablet PC, a set-top box (STB), a Personal Digital Assistant (PDA), a cellular telephone, a web appliance, a server, a network router, switch or bridge, vehicular circuitry, vehicular on-board computer or any machine capable of executing a set of instructions (sequential or otherwise) that specify actions to be taken by that system 700.

The controller 708 may include any suitable special-purpose or general-purpose computer, computing entity, or processing device and/or may include various computer hardware or software modules and may be configured to execute instructions stored on any applicable computer-readable storage medium. The term "processing device" is used herein to refer to any combination of one or more integrated circuits and/or packages that include one or more processors (e.g., one or more processor cores). Therefore, the term processing device encompasses a microcontroller, a single core CPU, a multi-core CPU and a massively multi-core system that includes many interconnected integrated circuits, each of which may include multiple processor cores. The processing device may therefore include multiple processors. The processing device may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or any other digital or analog circuitry configured to interpret and/or to execute computer-executable instructions and/or to process data. Although illustrated as a single controller 708, the controller 708 may include any number of controllers configured to, individually or collectively, perform or direct performance of any number of operations described in the present disclosure. In some embodiments, the controller 708 may include a separate or integrated AI chip which can serve as a center for sensor fusion.

In some embodiments, the controller 708 may be configured to interpret and/or execute computer-executable instructions and/or process data stored in the memory 710 and/or other data storage. In some embodiments, the controller 708 may fetch computer-executable instructions from a persistent data storage and load the computer-executable instructions in a non-persistent storage such as the memory 710. After the computer-executable instructions are loaded into memory 710, the controller 708 may execute the computer-executable instructions. In some embodiments, the computer-executable instructions may implement appropriate algorithms to estimate, compare and/or otherwise analyze various vehicle seat parameters.

The memory 710 may include computer-readable storage media for carrying or having computer-executable instructions or data structures stored thereon. Such computer-readable storage media may include any available media that may be accessed by a general-purpose or special-purpose computer, such as the controller 708. By way of example, such computer-readable storage media may include tangible or non-transitory computer-readable storage media including Random Access Memory (RAM), Read-Only Memory (ROM), Electrically Erasable Programmable Read-Only Memory (EEPROM), flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the controller 708 to perform or control performance of a certain operation or group of operations.

The communication module 712 may include one or more circuits or devices configured to facilitate communication between the system 700 and one or more external or remote devices. In some embodiments, such circuits or devices may include a transmitter, a receiver, a transceiver, and/or an antenna. For example, the communication module 712 may include one or more wireless chips to communicate wirelessly using any proprietary or standards-based wireless protocol, examples of which include the IEEE 807.11 standards (e.g., WiFi), Bluetooth, Zigbee, and the like.

In some embodiments, the computed end results of the system 700 may be transmitted to an end user recipient. In some embodiments, the end user recipient can be a smartphone. In some embodiments, the end user recipient can be a cloud server. In some embodiments, the end user recipient can be the vehicle itself or portion thereof, e.g., a seat adjustment system and/or a visual display or indicator lamp, not shown. In some embodiments, the output can be sent to a processing unit of the vehicle which can suggest to the occupant to readjust their position within the vehicle seat, e.g., reposition the occupant to conform to improved posture. In some embodiments, the output can be sent to a data logger within the vehicle. In some embodiments, the output can be sent to an indicator light to indicate the achievement of a given threshold parameter.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description above. In addition, the present embodiments are not described with reference to any particular programming language. It will be appreciated that a variety of programming languages may be used to implement the teachings of the embodiments as described herein.

Some embodiments herein include methods of making flexible sensors, such as the flexible seat sensors herein. FIGS. 8A-8H illustrate an example of a method to make a flexible sensor 800 (FIGS. 8G, 8H), arranged in accordance with at least one embodiment described herein. In general, the method may include making a stacked construct from a single starting sheet arranged in regions of equal size and/or shape by removing predetermined regions and sequentially folding a remainder portion of the starting sheet such that remainder regions are stacked in the remainder portion are stacked. The method is discussed in further detail below.

Figure 8A:
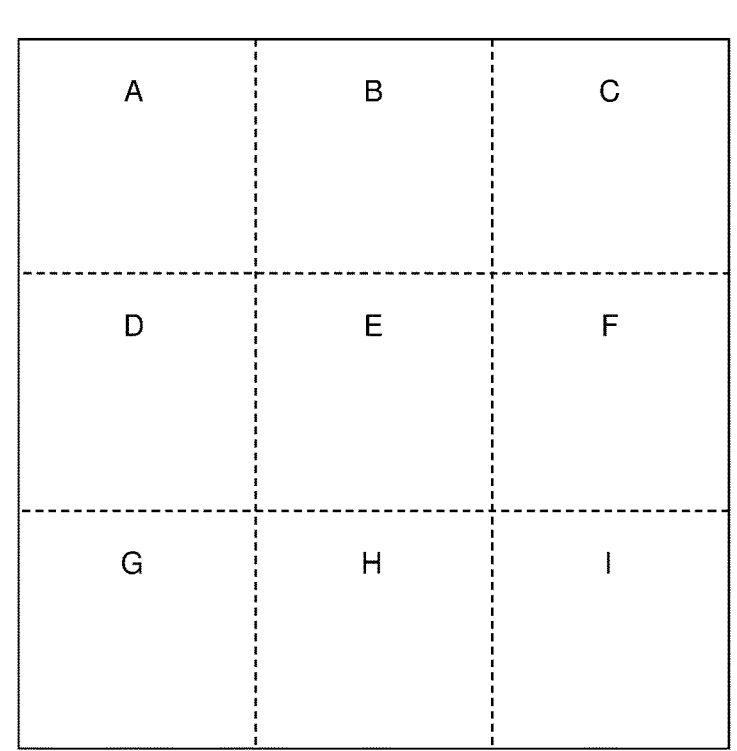
FIGS. 8A-8H illustrate an example of a method to make a flexible sensor.

FIG. 8A illustrates an example starting sheet 802 that includes a dielectric layer as a base or substrate. The starting sheet 802 is arranged in multiple regions A-I of equal size and/or shape, the dielectric layer extending continuously across all of the regions A-I. The dashed lines in FIGS. 8A-8G designate potential fold or cut lines and/or delimit the regions A-I from each other. There may or may not be an actual structural separation between adjacent regions along the dashed lines. The regions A-I include four corner regions A, C, G, I, four medial regions B, D, F, H positioned between the corner regions A, C, G, I, and a center region surrounded by the corner regions A, C, G, I and the medial regions B, D, F, H. The starting sheet 802 and the regions A-I may be rectangular or other shape. Alternatively or additionally, a footprint of each of the regions A-I may be equal in size and/or shape to a footprint of the flexible sensor 800.

Some of the regions A-I may not be used or necessary in the flexible sensor 800 and may be removed. In some embodiments, the regions that are removed from the starting sheet 802, and in particular the corner regions A, C, and I in this example, are referred to as predetermined regions.

Figure 8B:
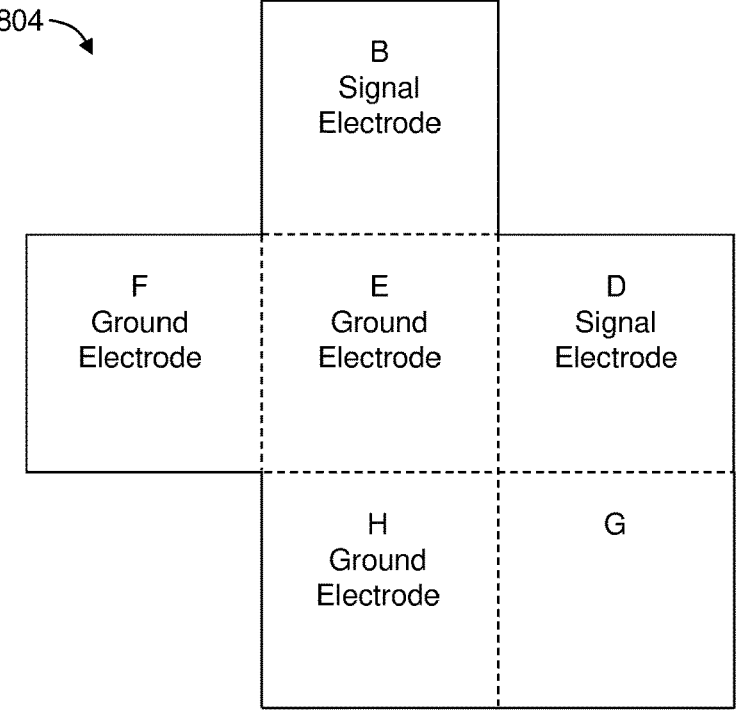
Figure 8C:
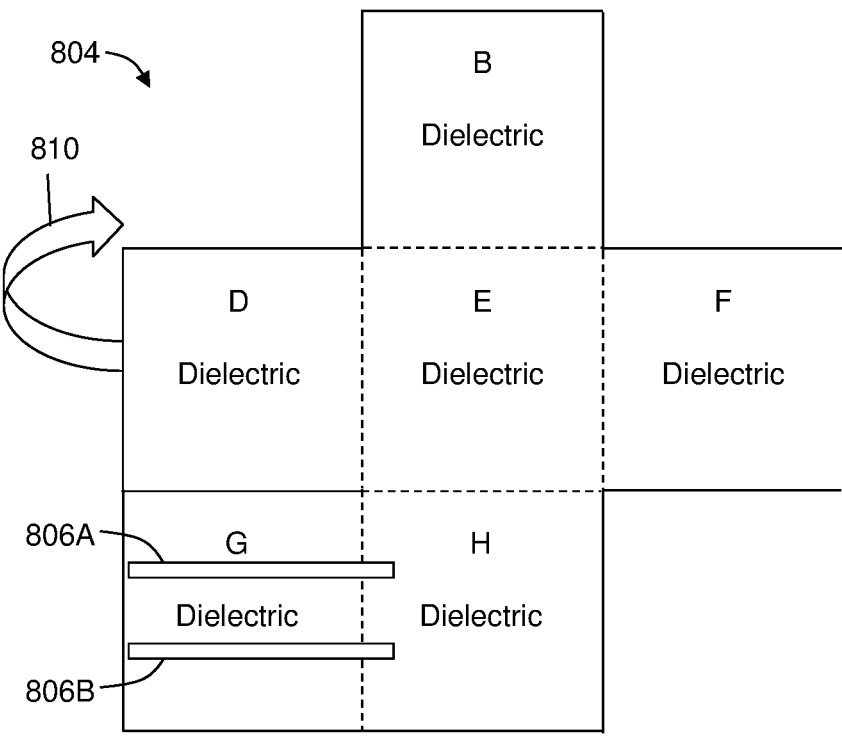

FIGS. 8B and 8C depict a remainder portion 804 of the starting sheet 802 after removal of the predetermined regions A, C, I. The regions that are not removed from the starting sheet 802 and remain in the remainder portion 804, and in particular the regions B and D-H in this example, are referred to as remainder regions.

A side of the starting sheet 802 or remainder portion 804 of the starting sheet 802 depicted in FIGS. 8A and 8C is referred to as a first side. A side of the starting sheet 802 or remainder portion 804 of the starting sheet 802 depicted in FIG. 8C that is opposite the first side is referred to as a second side.

Referring to FIG. 8B, each of the remainder regions B, D-F, H includes an electrically conductive structure identified in this example as an electrode. Each electrode is designated as a signal electrode or a ground electrode as each electrode may be a corresponding signal electrode or ground electrode in the flexible sensor 800. Each electrode may be formed on or in the dielectric layer that extends continuously across the remainder regions B, D-F, H of the remainder portion 804, e.g., in the same or similar manner as described with respect to FIGS. 2-4 or in other suitable manner. All of the electrodes are located on the same side, e.g., the second side, of the remainder portion 804.

Referring to FIG. 8C, each of the remainder regions B, D-F, H is labeled "Dielectric" which indicates the dielectric layer is located on the first side of the remainder portion 804.

In general, and as illustrated in FIGS. 8C-8F, the method may then include sequentially folding the remainder portion 804 of the starting sheet 802 to arrange the remainder regions B, D-F, H in a stack in which each electrically conductive structure in a given remainder region is spaced apart from one or more other electrically conductive structures in one or more adjacent remainder regions of the stack by at least one of the dielectric layer in the given remainder region or the dielectric layer in the adjacent remainder region. Some embodiments may further include separating two or more of the remainder regions B, D-H from each other along a shared border while maintaining a connection to the remainder portion 804 of each of the remainder regions thus separated. For example, FIG. 8C includes a solid line at a shared boundary of the medial region D and the corner region G, indicating that the medial region D and the corner region G have been separated along their shared boundary. However, the dashed lines denoting the shared boundary between the medial region D and the center region E and the shared boundary between the corner region G and the medial region H indicate that the connections of the medial region D and the corner region G to the center region E and the medial region H have been maintained.

The method may include adding or forming electrical traces or other conductive structures on the first side of one or more of the remainder regions B, D-H. The addition of the electrical traces or other conductive structures may be performed before the predetermined regions A, C, I are removed from the starting sheet 802, before the remainder portion 804 is folded, after some of the folds are made but before all of the folds are made, or after all of the folds are made. FIGS. 8C-8G illustrate example electrical traces 806A, 806B (hereinafter collectively "traces 806" or generically "trace 806") that may be formed on the dielectric side of the corner region G, with small portions extending onto the medial region H. The traces 806 may be electrically coupled to one or more ground electrodes in the flexible sensor 800.

Alternatively or additionally, the ground electrodes of regions E, F, H may be electrically coupled together, e.g., by coupling one or more direct electrical connectors (such as the direct electrical connectors 308, 408A, 408B) between the ground electrodes of the regions E and F and/or between the ground electrodes of the regions E and H on the second side of the regions E, F, H.

Figure 8D:
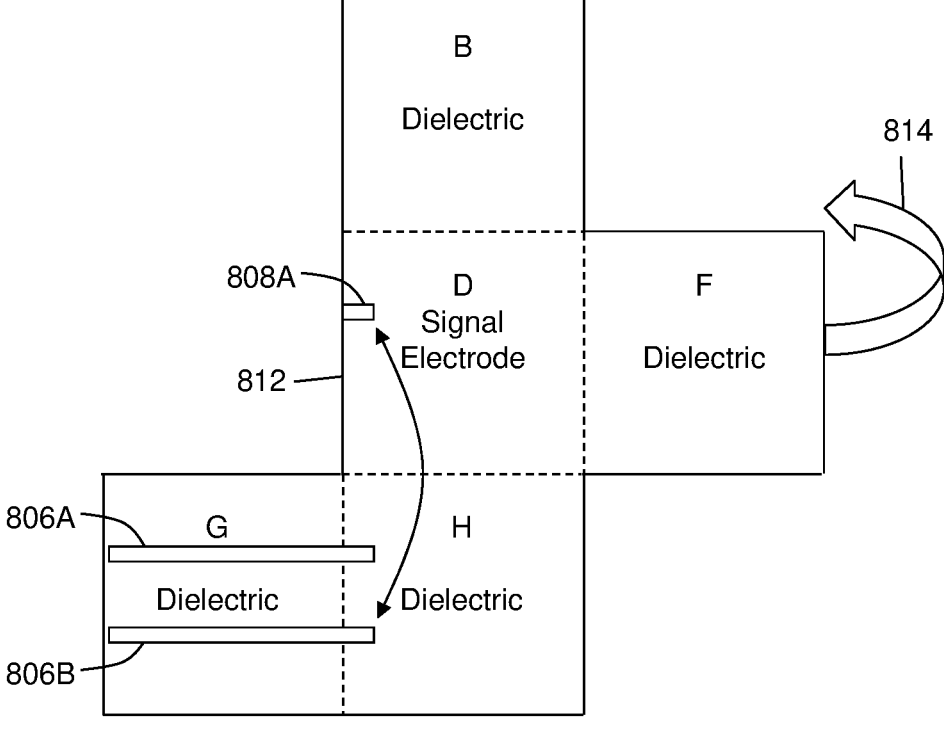
Figure 8E:
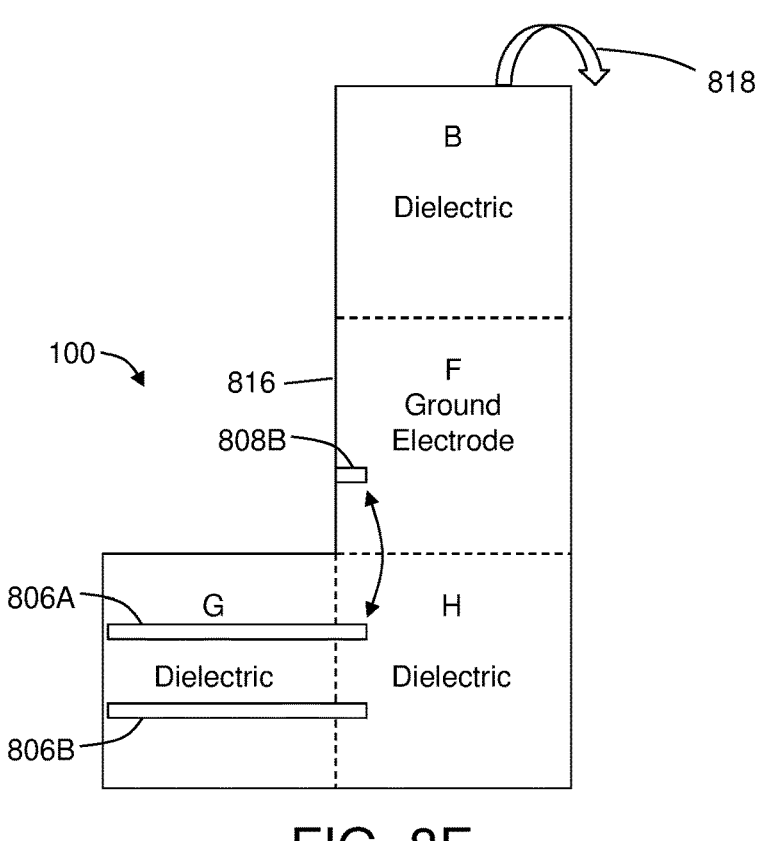

Alternatively or additionally, trace contact pads may be formed on two or more of the electrodes to electrically couple the electrodes to the traces 806. For example, FIG. 8D illustrates a trace contact pad 808A formed on the signal electrode of the region D to electrically couple the signal electrode of the region D to the trace 806B. As another example, FIG. 8E illustrates a trace contact pad 808B formed on the ground electrode of the region F to electrically couple the ground electrode of the region F to the trace 806A. In some embodiments, one or more apertures may be formed through one or more of the regions F and B to accommodate metallization or other conductive material or particles to connect the trace contact pads 808 to the traces 806.

Figure 8F:
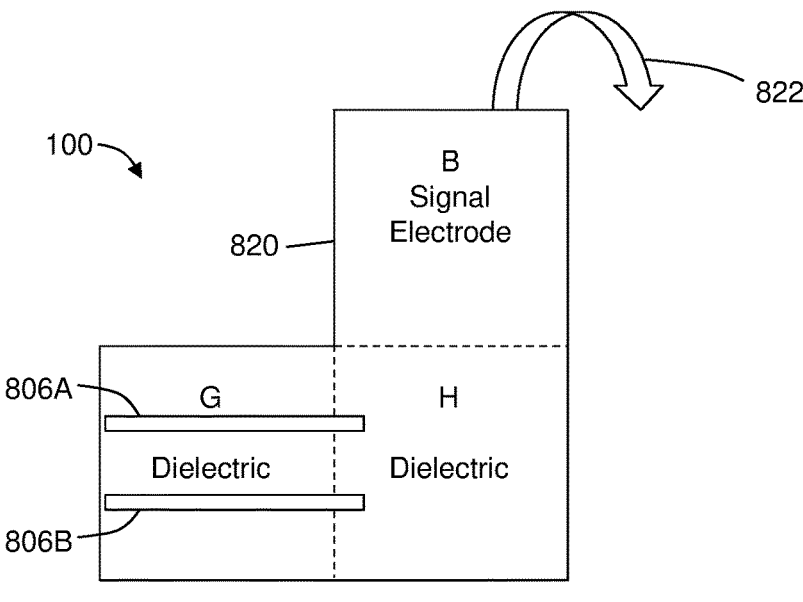
Figure 8G:
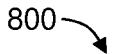
Figure 8G:
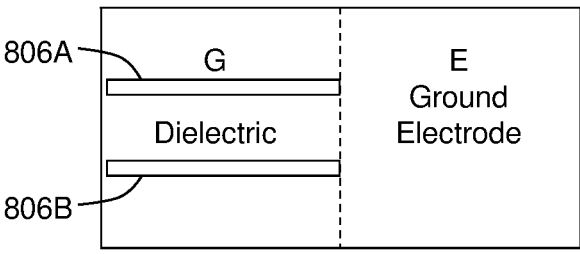

In some embodiments, sequentially folding the remainder portion 804 to arrange the remainder regions B, D-F, H in a stack includes folding the medial region D onto the center region E as indicated at 810 in FIG. 8C to form a first intermediate stack 812 (FIG. 8D), folding the medial region F onto the first intermediate stack 812 as indicated at 814 in FIG. 8D to form a second intermediate stack 816 (FIG. 8E), folding the medial region B onto the second intermediate second stack 816 as indicated at 818 in FIG. 8E to form a third intermediate stack 820 (FIG. 8F), and folding the third intermediate stack 820 onto the medial region H as indicated at 822 in FIG. 8F to form the flexible sensor 800 (FIG. 8G).

Figure 8H:
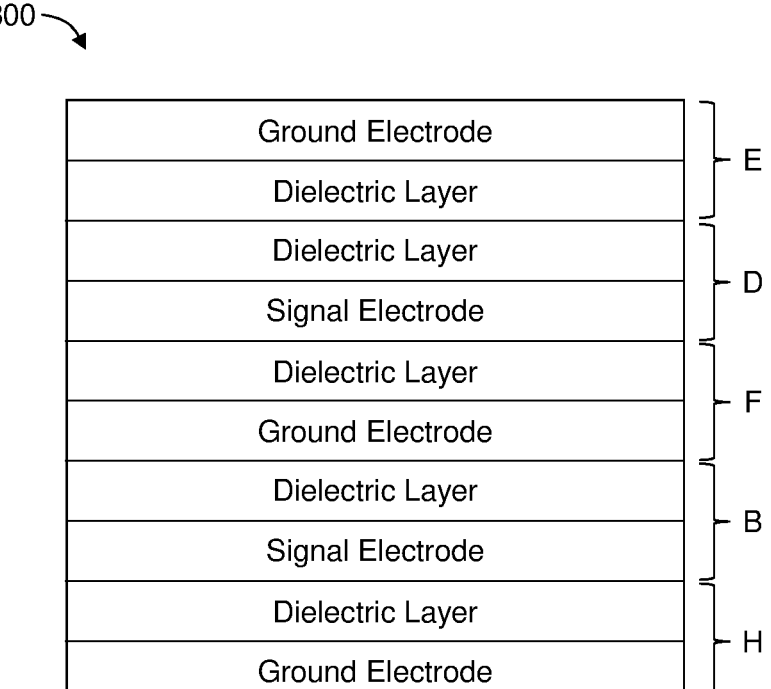

FIG. 8H illustrates the stack remainder regions B, D-F, H after folding the remainder portion 804 as described with respect to FIGS. 8C-8G. Sequentially folding the remainder portion 804 in this embodiment results in the remainder region D with its signal electrode being positioned between the remainder region E and the remainder region F each having a corresponding ground electrode. The sequential folding further results in dielectric being interposed between the signal electrode of the remainder region D and the ground electrodes of each of the remainder regions E and F. For example, the dielectric layer of the remainder regions D and E is positioned between the signal electrode of the remainder region D and the ground electrode of the remainder region E while the dielectric layer of the remainder region F is positioned between the signal electrode of the remainder region D and the ground electrode of the remainder region F. The remainder region B with its signal electrode similarly ends up positioned between the remainder region F and the remainder region H with their ground electrodes, the signal electrode of the remainder region B being separated from the ground electrode of the remainder region F or H by dielectric layers of the remainder regions B and H.

The flexible sensor 800 formed according to the method of FIGS. 8A-8H thus includes three ground electrodes and two signal electrodes in a similar arrangement to the ground electrodes 404 and signal electrodes 402 of FIG. 4.

In some embodiments, the footprint of the flexible sensor 800 is approximately 1 centimeter (cm) by 1 cm. In this and other embodiments, footprints of the regions A-I of the starting sheet 802 may each be 1 cm by 1 cm.

One or more methods herein may further include assembling one or more flexible sensors, such as the flexible sensor 800 or other flexible sensors (e.g., flexible seat sensors) herein, into a flexible sensor mat, such as the flexible sensor mats 108, 500, and electrically coupling each flexible sensor to an electronics unit, such as the electronics unit 106 or other electronics units herein. Alternatively or additionally, such methods may further include installing the flexible sensor mat in a vehicle seat with the flexible sensors in different locations of the vehicle seat. While the regions A-I are described as being rectangular, more generally the regions A-I may have any shape, so long as they can be connected in some manner to enable folding upon each other and stacking. In some embodiments, each region A-I may have substantially the same area as the flexible sensor 800.

In some embodiments, a method for determining seat strain includes calibrating the above-described flexible seat sensors, flexible sensors, and/or vehicle seat sensor systems by determining a reference capacitive sensor amplitude output with no occupant or weight disposed upon the flexible seat sensor. In some embodiments, the method may include receiving a capacitive sensor amplitude output generated by actual, e.g., real time vehicle seat parameters, e.g., presence of an occupant, child or adult occupant, posture and/or physical positioning of the occupant upon the seat surface, contact with the occupant with the seat surface, or the like. In some embodiments, the method may include determining the posture, occupant and or angle of inclination of the occupant's body, e.g., by correlating the received discharge amplitudes and/or specific strain sensor amplitude outputs with known weight value thresholds, correct posture or positioning contacts and quantities.

In some embodiments, a method to determine sitting posture of an occupant of a vehicle seat includes charging flexible seat sensors of a vehicle seat sensor system with direct current. The flexible seat sensors and/or vehicle seat sensor system may include any of the flexible seat sensors and/or vehicle seat sensor systems described herein. The flexible seat sensors may be positioned in different locations of a vehicle seat and within a deformable distance from a seat surface of the different locations of the vehicle seat. The different locations of the vehicle seat may include at least two of: a seat portion, a back support portion, a leg support portion, or an armrest portion. Each of the flexible seat sensors may include a capacitive sensor and may include one or more signal electrodes, one or more ground electrodes, and one or more dielectric layers. In some embodiments, the method includes receiving occupancy data from each of the flexible seat sensors based on an amount of discharged charge of each flexible seat sensor. In some embodiments, the method includes analyzing the occupancy data from the flexible seat sensors to determine a seat posture of the occupant in the vehicle seat. Analyzing the occupancy data may include comparing the occupancy data from the flexible seat sensors. In some embodiments, the method includes conveying the determined seat posture to the occupant and/or communicating a recommended change in seat posture to the occupant. The occupancy data may include quantized capacitive discharge output from the flexible seat sensors, the quantized capacitive discharge of each flexible seat sensor proportional to an amount of compression, distention, and/or displacement experienced by the corresponding flexible seat sensor.

In some embodiments, a method to determine proper sitting posture within a vehicle seat is described. The method may be implemented with one or more of the flexible seat sensors, electronics units, and/or other components described herein. In some embodiments, the method includes providing one or more flexible seat sensors within one or more selected locations in the vehicle seat; receiving occupancy data from the flexible seat sensors; and/or comparing the received occupancy data to determine a desired occupancy characteristic, e.g., current seat posture, occupancy, occupant age. In some embodiments the received occupancy data can be quantized capacitive discharge output from the capacitor constructs, the quantized capacitive discharge proportional to the amount of compression, distention, and or displacement experienced by the flexible seat sensor. In some embodiments, the quantized capacitive discharge can be compared with predetermined discharge amounts corresponding to proper posture, e.g., a person sitting properly and or with correct posture would provide the pre-determined quantized capacitive discharge amounts from the flexible seat sensors. In some embodiments, the method can further include communicating the determined occupancy posture to the occupant. In some embodiments, the locations in the vehicle seat include locations within the inside upper back rest of the vehicle seat. In some embodiments, the locations in the vehicle seat can include locations within the inside upper back rest of at least one other second vehicle seat, e.g., a passenger seat. In some embodiments, the locations in the vehicle seat can comprise sensors located within the inside upper back rest of at least one other second vehicle seat, e.g., passenger seat. In some embodiments, the locations can be in any or some of the vehicle seat sections described herein. In some embodiments, the vehicle seat can be a land vehicle seat, e.g., an automobile, truck, recreational vehicle, motorcycle, motor driven cycle, bus, trolley; an air travel vehicle seat, e.g., airplane, helicopter; or a marine vehicle seat, e.g., aboard a boat, ship, barge, ferry.

EXAMPLES

Example—1 Formation of Flexible Sensor Mat

Embodiments of the layers substantially as depicted in one or more of FIGS. 2-4 were manufactured and constructed, in a manner similar to that used to make 1-axis Soft Flex Sensor (Bend Labs, Salt Lake City, Utah, USA) (U.S. Pat. Nos. 8,941,281; 9,476,692; 9,874,431) and TIRE AND TIRE SYSTEM (International Patent Publication WO/2021/168286; based on U.S. Provisional Application No. 63/118,561 filed Nov. 25, 2020) and assembled in a flexible sensor mat. Each of the foregoing patents, publications, and/or applications is incorporated herein by reference in its entirety. Five flexible seat sensors were formed/manufactured (10 channels) and arranged in a vehicle seat as illustrated in FIG. 1A. The number of the flexible seat sensors can be determined as needed.

Example—2 Formation of Flexible Sensor Mat

Embodiments of the layers substantially as depicted in one or more of FIG. 3A-4 were manufactured and constructed as depicted, in a manner similar to that used to make 1-axis Soft Flex Sensor (Bend Labs, Salt Lake City, Utah, USA) (U.S. Pat. Nos. 8,941,281; 9,476,692; 9,874,431; and TIRE AND TIRE SYSTEM (International Patent Publication WO/2021/168286; based on U.S. Provisional Application No. 63/118,561 filed Nov. 25, 2020) and assembled in a flexible sensor mat. While in this embodiment, five sensor regions were formed/manufactured (10 channels), the number of the sensor regions can be determined as needed. In addition, since the number of sensor regions is reduced, a multiplexing circuit is not needed herein. In addition, in this embodiment, in the non-sensor regions, the ground electrodes were cross-hatched at about 45° relative the longitudinal axis of the sensor. The ground electrodes were disposed upon other layers by depositing conductive ink upon the respective dielectric layers. In addition, note that the location of flexible seat sensors 104A and 104B correspond to being placed within the vehicle seat cushion, the location of flexible seat sensors 104D and 104E correspond to being placed within the back support portion 112 corresponding to the lumbar regions of a vehicle seat occupant. Other dielectric layer(s) and conductive layer(s) (or electrode(s)) were manufactured in a similar manner to create a five-layer laminate including a pair of strain sensors (or capacitors) one on top of each other to create the stacked laminate as shown in FIG. 3A. Other embodiments include seven, eleven and or plural layered laminates constructed similar to that in FIGS. 3B and 4.

Example—3 Formation of Sensor System

A flexible sensor mat as described in Example 1 above was wired to a 9-volt battery and a blue tooth communicating circuit, including an RF antenna. Raw data output was viewed on a laptop computer.

Example—5 Strain and Displacement Testing

Figure 9A:
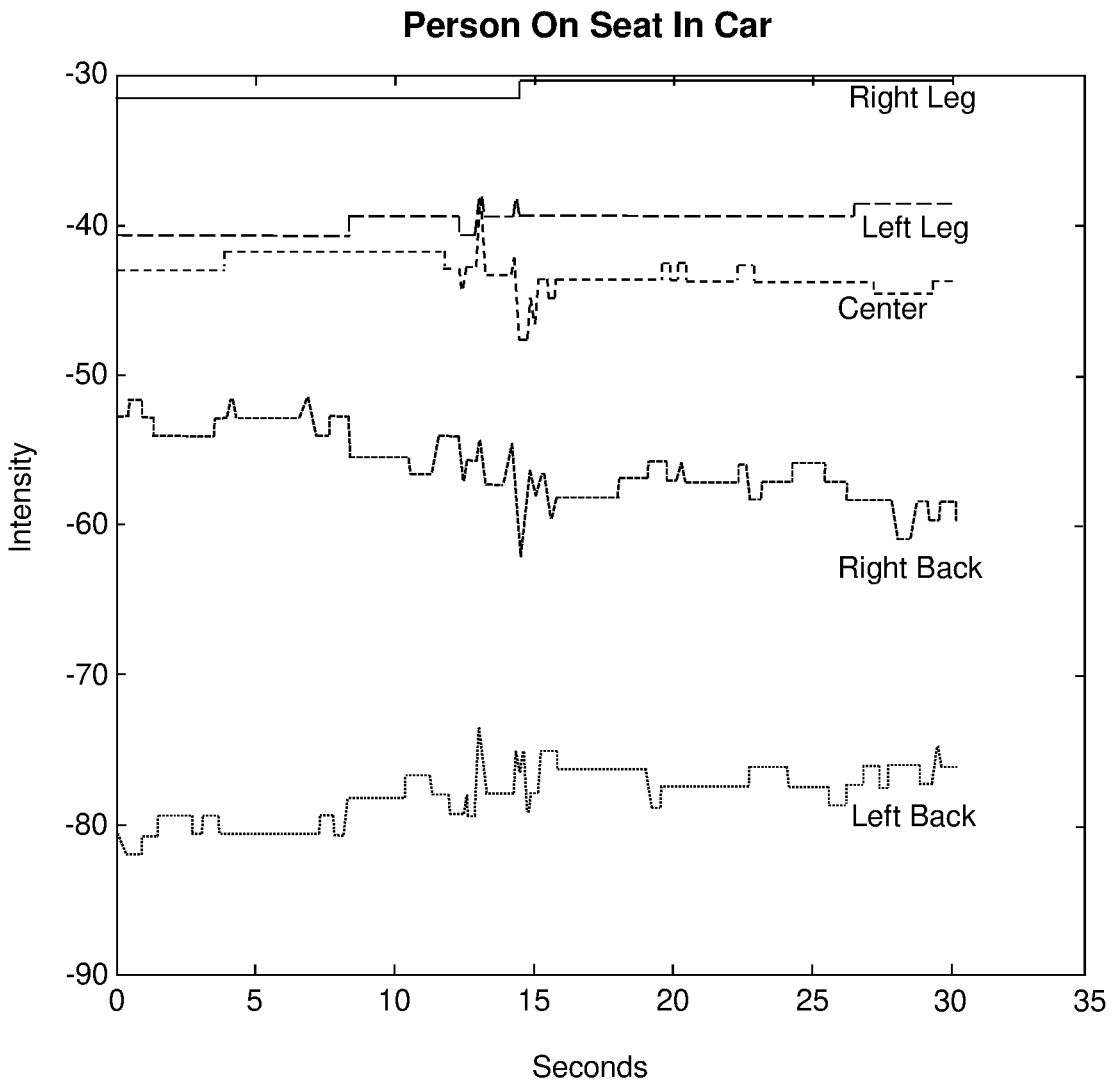
FIG. 9A includes experimental capacitive discharge intensity for each of five flexible seat sensors in an experimental vehicle seat sensor system.
Figure 9B:
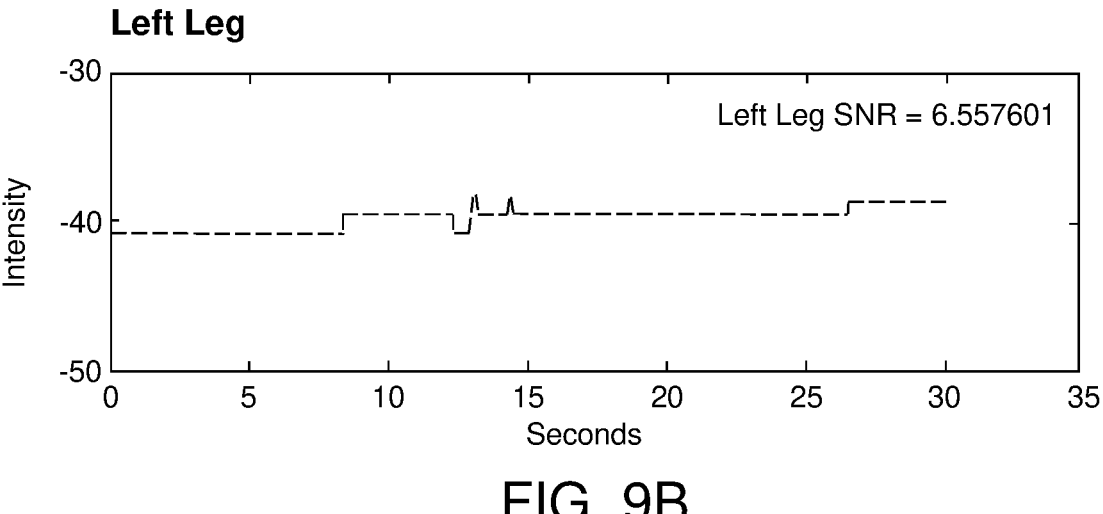
FIGS. 9B-9F depict the capacitive discharge intensity for each of the flexible seat sensors individually, all arranged in accordance with at least one embodiment described herein.
Figure 9C:
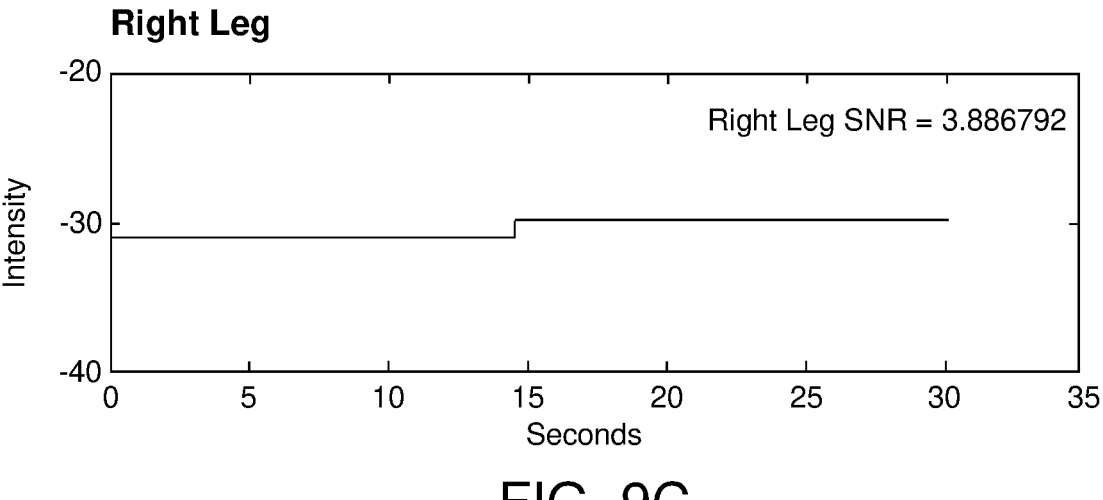
Figure 9D:
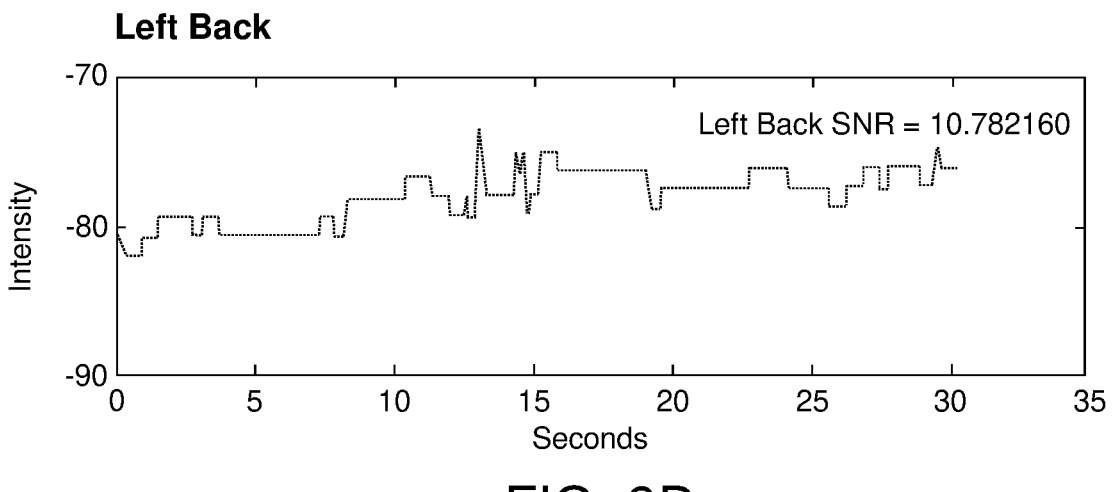
Figure 9E:
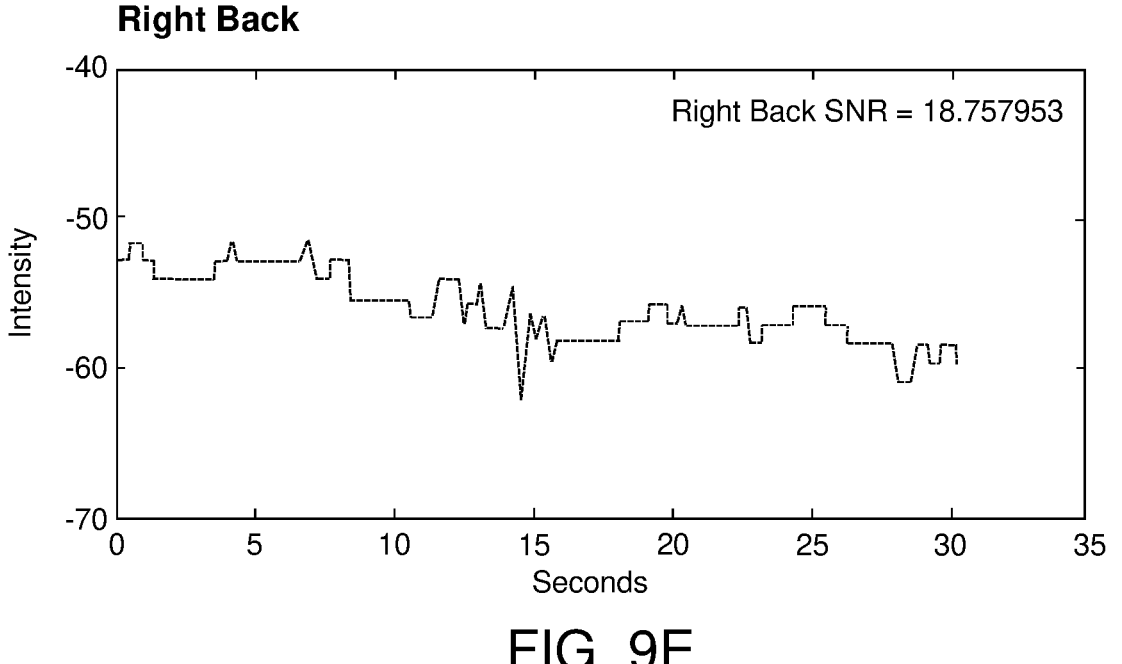
Figure 9F:
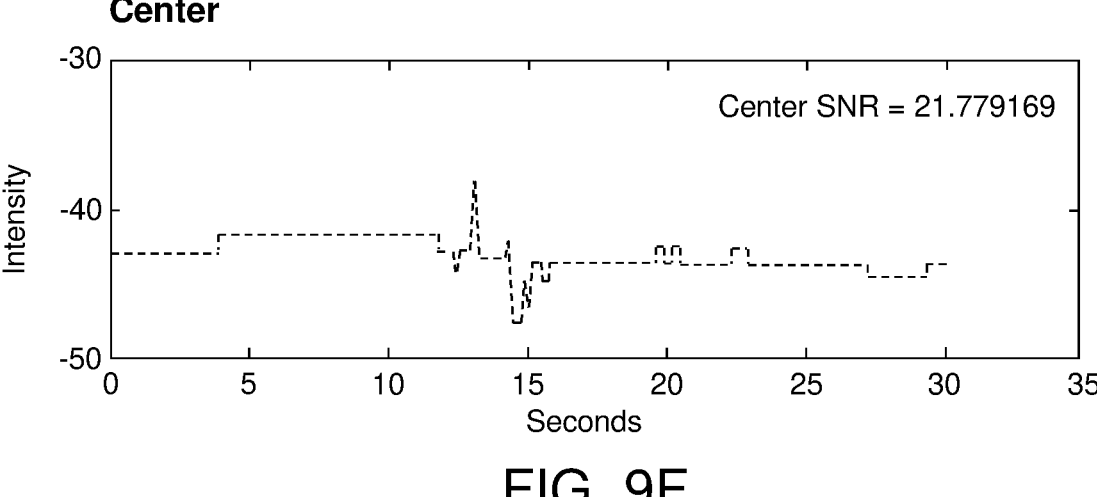

A vehicle seat sensor system constructed as described herein (including as in Examples 1 and 2 above) was inserted into a vehicle seat of a 1975 Toyota with at least the flexible seat sensors 104 correspondingly positioned on over the previously described vehicle seat portions. A 75 kilogram (kg) subject was positioned upon the sensor equipped vehicle seat, each sensor sent out raw data in the form of capacitive discharge which was viewed on a laptop computer with a blue-tooth receiver. The positioning of the occupant applied to the flexible seat sensors 104 was varied and the corresponding changes in the data was noted. The capacitive discharge intensity as generated by the above-described vehicle seat sensor system are shown in FIGS. 9A-9F. FIG. 9A includes capacitive discharge intensity for all of the flexible seat sensors 104, arranged in accordance with at least one embodiment described herein. In FIG. 9A, the capacitive discharge intensity for the flexible seat sensor 104A is labeled "Right Leg", the capacitive discharge intensity for the flexible seat sensor 104B is labeled "Left Leg", the capacitive discharge intensity for the flexible seat sensor 104C is labeled "Center", the capacitive discharge intensity for the flexible seat sensor 104D is labeled "Right Back", and the capacitive discharge intensity for the flexible seat sensor 104E is labeled "Left Back". FIGS. 9B-9F depict the capacitive discharge intensity for each of the flexible seat sensors 104 individually and additionally indicate the signal to noise ratio (SNR) of the given measurement, arranged in accordance with at least one embodiment described herein. It can be seen from FIG. 9A that with the subject seated in a particular orientation, increased pressure was indicated at the left back position (e.g., as detected by the flexible seat sensor 104E) relative to the right back position (e.g., as detected by the flexible seat sensor 104D). This indicated a sitting posture that can be corrected.

For the processes and/or methods disclosed herein, the functions performed in the processes and methods may be implemented in differing order, as may be indicated by context. Furthermore, the outlined steps and operations are only provided as examples and some of the steps and operations may be optional, combined into fewer steps and operations, or expanded into additional steps and operations.

This disclosure may sometimes illustrate different components contained within, or connected with, different other components. Such depicted architectures are merely exemplary, and many other architectures may be implemented which achieve the same or similar functionality.

Unless otherwise indicated, all numbers expressing quantities of ingredients, properties such as molecular weight, reaction conditions, and so forth used in the specification and embodiments are to be understood as being modified in all instances by the term "about." Accordingly, unless indicated to the contrary, the numerical parameters set forth in the specification and attached embodiments are approximations that may vary depending upon the desired properties sought to be obtained. At the very least, and not as an attempt to limit the application of the doctrine of equivalents to the scope of the embodiments, each numerical parameter should at least be construed in light of the number of reported significant digits and by applying ordinary rounding techniques.

The terms used in this disclosure and in the appended embodiments, (e.g., bodies of the appended embodiments) are generally intended as "open" terms (e.g., the term "including" should be interpreted as "including, but not limited to," the term "having" should be interpreted as "having at least," the term "includes" should be interpreted as "includes, but not limited to," etc.). In addition, if a specific number of elements is introduced, this may be interpreted to mean at least the recited number, as may be indicated by context (e.g., the bare recitation of "two recitations," without other modifiers, means at least two recitations of two or more recitations). As used in this disclosure, any disjunctive word and/or phrase presenting two or more alternative terms should be understood to contemplate the possibilities of including one of the terms, either of the terms, or both terms. For example, the phase "A or B": will be understood to include the possibilities of "A" or "B" or "A and B."

The terms "a," "an," "the" and similar referents used in the context of describing the present disclosure (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or representative language (e.g., "such as") provided herein is intended merely to better illuminate the present disclosure and does not pose a limitation on the scope of any claim. No language in the specification should be construed as indicating any non-claimed element essential to the practice of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the present disclosure. Of course, variations on these described embodiments will become apparent to those of ordinary skill in the art upon reading the foregoing description. The inventor expects skilled artisans to employ such variations as appropriate, and the inventors intend for the present disclosure to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

Embodiment 1. A vehicle seat sensor system, comprising:
a vehicle seat comprising a seat surface;
a flexible seat sensor disposed within a deformable distance from the seat surface, the flexible seat sensor comprising:
one or more signal electrodes;
one or more ground electrodes;
one or more dielectric layers; and
one or more capacitors, each capacitor formed by a combination of a corresponding signal electrode and a corresponding ground electrode with a corresponding dielectric layer positioned between the corresponding signal electrode and the corresponding ground electrode; and
an electronics unit connected to the flexible seat sensor and configured to electrically communicate with the flexible seat sensor,
wherein the flexible seat sensor is configured to provide a capacitive output proportional to an amount of pressure applied to the flexible seat sensor.

Embodiment 2. The vehicle seat sensor system of embodiment 1, wherein:
the one or more signal electrodes includes a first signal electrode;
the one or more ground electrodes includes first and second ground electrodes;
the one or more dielectric layers includes first and second dielectric layers positioned on opposite sides of the first signal electrode;
the one or more capacitors comprises a first capacitor formed by the first ground electrode spaced apart from the first signal electrode by the first dielectric layer and a second capacitor formed by the second ground electrode spaced apart from the first signal electrode by the second dielectric layer; and
the first and second ground electrodes are electrically coupled to each other.

Embodiment 3. The vehicle seat sensor system of embodiment 2, wherein:
the one or more signal electrodes further includes a second signal electrode;
the one or more ground electrodes further includes a third ground electrode;
the one or more dielectric layers further includes third and fourth dielectric layers positioned on opposite sides of the second signal electrode;
the one or more capacitors further comprises a third capacitor formed by the second ground electrode spaced apart from the second signal electrode by the third dielectric layer and a fourth capacitor formed by the third ground electrode spaced apart from the second signal electrode by the fourth dielectric layer; and the first, second, and third ground electrodes are electrically coupled to each other.

Embodiment 4. The vehicle seat sensor system of embodiment 2, wherein the flexible seat sensor further comprises at least one of:

a first insulating layer positioned on a surface of the first ground electrode opposite the first dielectric layer; or a second insulating layer positioned on a surface of the second ground electrode opposite the second dielectric layer.

Embodiment 5. The vehicle seat sensor system of any one of embodiments 1-4, wherein the one or more ground electrodes comprises a conductive material defining a plurality of apertures in the conductive material.

Embodiment 6. The vehicle seat sensor system of any one of embodiments 1-5, wherein the conductive material of the one or more ground electrodes is arranged in a mesh structure defining the plurality of apertures.

Embodiment 7. The vehicle seat sensor system of any one embodiments 1-6, wherein the flexible seat sensor comprises a material that is flexible in three dimensions.

Embodiment 8. The vehicle seat sensor system of any one of embodiments 1-7, wherein the flexible seat sensor comprises a material that is resiliently deformable in three dimensions.

Embodiment 9. The vehicle seat sensor system of any one of embodiments 1-8, wherein the flexible seat sensor comprises a single folded starting sheet including a dielectric with electrically conductive structures in remainder regions of the starting sheet, the remainder regions arranged in a stack, each of the one or more signal electrodes and the one or more ground electrodes comprising a corresponding electrically conductive structure in a different remainder region of the stack.

Embodiment 10. The vehicle seat sensor system of embodiment 9, wherein the remainder regions have a common shape.

Embodiment 11. The vehicle seat sensor system of any one of embodiments 9-10, wherein each of the remainder regions has a footprint equal in size and shape to a footprint of the flexible seat sensor.

Embodiment 12. The vehicle seat sensor system of any one of embodiments 1-11, wherein the electronics unit is configured to charge each capacitor by direct current and calculate a variation of electrostatic capacity of each capacitor based on an amount of discharged charge of each capacitor.

Embodiment 13. The vehicle seat sensor system of any one of embodiments 1-12, further comprising one or more additional flexible seat sensors disposed within the deformable distance from the seat surface.

Embodiment 14. The vehicle seat sensor system of embodiment 13, wherein:

the vehicle seat comprises a seat portion, a back support portion, and a leg support portion;

the seat surface extends across each of the seat portion, the back support portion, and the leg support portion;

the flexible seat sensor is positioned in the seat portion; and the one or more additional flexible seat sensors include at least a first flexible seat sensor positioned in the back support portion and a second flexible seat sensor positioned in the leg support portion.

Embodiment 15. The vehicle seat sensor system of any one of embodiments 1-14, wherein the vehicle seat comprises a land vehicle seat, an air travel vehicle seat, or a marine vehicle seat.

Embodiment 16. A method to make a flexible sensor, the method comprising:

removing one or more predetermined regions from a single starting sheet, a remainder portion of the starting sheet comprising a plurality of remainder regions having electrically conductive structures and a dielectric layer that extends continuously across the remainder regions, the electrically conductive structures all on a same side of the remainder portion of the starting sheet;

sequentially folding the remainder portion of the starting sheet to arrange the remainder regions in a stack in which each electrically conductive structure in a given remainder region is spaced apart from one or more other electrically conductive structures in one or more adjacent remainder regions of the stack by at least one of the dielectric layer in the given remainder region or the dielectric layer in the adjacent remainder region.

Embodiment 17. The method of embodiment 16, further comprising electrically conductively coupling a first electrically conductive structure of a first remainder region to a second electrically conductive structure of a second remainder region.

Embodiment 18. The method of any one of embodiments 16-17, wherein the sequentially folding comprises sequentially folding the remainder portion such that:

a third reminder region having a third electrically conductive structure is positioned between the first remainder region and the second remainder region;

the dielectric layer of at least the first or third remainder region is positioned between the first electrically conductive structure of the first remainder region and the third electrically conductive structure of the third remainder region; and the dielectric layer of at least the second or third remainder region is positioned between the second electrically conductive structure of the second remainder region and the third electrically conductive structure of the third remainder region.

Embodiment 19. The method of any one of embodiments 16-18, wherein each of the remainder regions has a footprint that is equal in size and shape to a desired footprint of the flexible seat sensor.

Embodiment 20. The method of any one of embodiments 16-19, further comprising forming the electrically conductive structures on the dielectric layer to form the single starting sheet.

Embodiment 21. The method of any one of embodiments 16-20, wherein the single starting sheet is rectangular with nine regions arranged in three rows of three regions each, the nine regions include first, second, third, and fourth corner regions, and removing the one or more predetermined regions comprises removing the first, second, and third corner regions.

Embodiment 22. The method of embodiment 21, wherein:

the nine regions further include first, second, third, and fourth medial regions;

the first and fourth medial regions are positioned on adjacent sides of the fourth corner region; and the method further comprises separating the fourth corner region from the first medial region along a first shared border between the fourth corner region and the first medial region while maintaining a connection of the fourth corner region to the fourth medial region along a second shared border between the fourth corner region and the fourth medial region.

Embodiment 23. The method of embodiment 22, wherein:

the nine regions further include a center region;

the remainder regions include the first, second, third, and fourth medial regions and the center region; and sequentially folding the remainder portions comprises:

folding the first medial region onto the center region to form a first intermediate stack;

folding the third medial region onto the first intermediate stack to form a second intermediate stack;

folding the second medial region onto the second intermediate stack to form a third intermediate stack; and folding the third intermediate stack onto the fourth medial region.

Embodiment 24. The method of any one of embodiments 16-23, further comprising assembling the flexible sensor into a flexible sensor mat together with one or more additional flexible sensors and electrically coupling each flexible sensor to an electronics unit.

Embodiment 25. The method of embodiment 24, further comprising installing the flexible sensor mat in a vehicle seat with the flexible sensors positioned in different locations of the vehicle seat.

Embodiment 26. A method to determine sitting posture of an occupant of a vehicle seat, the method comprising:

charging flexible seat sensors of a vehicle seat sensor system with direct current, the flexible seat sensors positioned in different locations of a vehicle seat and within a deformable distance from a seat surface of the different locations of the vehicle seat, each of the flexible seat sensors comprising a capacitive sensor and including one or more signal electrodes, one or more ground electrodes, and one or more dielectric layers;

receiving occupancy data from each of the flexible seat sensors based on an amount of discharged charge of each flexible seat sensor; and analyzing the occupancy data from the flexible seat sensors to determine a seat posture of the occupant in the vehicle seat.

Embodiment 27. The method of embodiment 26, further comprising conveying the determined seat posture to the occupant.

Embodiment 28. The method of any one of embodiments 26-27, further comprising communicating a recommended change in seat posture to the occupant.

Embodiment 29. The method of any one of embodiments 26-28, wherein the occupancy data comprises quantized capacitive discharge output from the flexible seat sensors, the quantized capacitive discharge of each flexible seat sensor proportional to an amount of compression, distention, and/or displacement experienced by the corresponding flexible seat sensor.

Embodiment 30. The method of any one of embodiments 26-29, wherein the different locations of the vehicle seat comprise at least two of: a seat portion, a back support portion, a leg support portion, or an armrest portion.

Embodiment 31. The method of any one of embodiments 26-30, wherein analyzing the occupancy data comprises comparing the occupancy data from the flexible seat sensors.

What is claimed is:

1. A vehicle seat sensor system, comprising:

a vehicle seat comprising a seat surface;

a flexible seat sensor disposed within a deformable distance from the seat surface, the flexible seat sensor comprising:

one or more signal electrodes;

one or more ground electrodes;

one or more dielectric layers; and one or more capacitors, each capacitor formed by a combination of a corresponding signal electrode and a corresponding ground electrode with a corresponding dielectric layer positioned between the corresponding signal electrode and the corresponding ground electrode; and an electronics unit connected to the flexible seat sensor and configured to electrically communicate with the flexible seat sensor, wherein the flexible seat sensor is configured to provide a capacitive output proportional to an amount of pressure applied to the flexible seat sensor;

the one or more signal electrodes includes a first signal electrode;

the one or more ground electrodes includes first and second ground electrodes;

the one or more dielectric layers includes first and second dielectric layers positioned on opposite sides of the first signal electrode;

the one or more capacitors comprises a first capacitor formed by the first ground electrode spaced apart from the first signal electrode by the first dielectric layer and a second capacitor formed by the second ground electrode spaced apart from the first signal electrode by the second dielectric layer;

the first and second ground electrodes are electrically coupled to each other; the flexible seat sensor further comprises at least one of; and a first insulating layer positioned on a surface of the first ground electrode opposite the first dielectric layer; or a second insulating layer positioned on a surface of the second ground electrode opposite the second dielectric layer.

2. The vehicle seat sensor system of claim 1, wherein:

the one or more signal electrodes further includes a second signal electrode;

the one or more ground electrodes further includes a third ground electrode;

the one or more dielectric layers further includes third and fourth dielectric layers positioned on opposite sides of the second signal electrode;

the one or more capacitors further comprises a third capacitor formed by the second ground electrode spaced apart from the second signal electrode by the third dielectric layer and a fourth capacitor formed by the third ground electrode spaced apart from the second signal electrode by the fourth dielectric layer; and the first, second, and third ground electrodes are electrically coupled to each other.

3. The vehicle seat sensor system of claim 1, wherein the one or more ground electrodes comprises a conductive material defining a plurality of apertures in the conductive material.

4. The vehicle seat sensor system of claim 3, wherein the conductive material of the one or more ground electrodes is arranged in a mesh structure defining the plurality of apertures.

5. The vehicle seat sensor system of claim 1, wherein the flexible seat sensor comprises a material that is flexible in three dimensions.

6. The vehicle seat sensor system of claim 1, wherein the flexible seat sensor comprises a material that is resiliently deformable in three dimensions.

7. The vehicle seat sensor system of claim 1, wherein the flexible seat sensor comprises a single folded starting sheet including a dielectric with electrically conductive structures in remainder regions of the starting sheet, the remainder regions arranged in a stack, each of the one or more signal electrodes and the one or more ground electrodes comprising a corresponding electrically conductive structure in a different remainder region of the stack.

8. The vehicle seat sensor system of claim 7, wherein the remainder regions have a common shape.

9. The vehicle seat sensor system of claim 7, wherein each of the remainder regions has a footprint equal in size and shape to a footprint of the flexible seat sensor.

10. The vehicle seat sensor system of claim 1, wherein the electronics unit is configured to charge each capacitor by direct current and calculate a variation of electrostatic capacity of each capacitor based on an amount of discharged charge of each capacitor.

11. The vehicle seat sensor system of claim 1, further comprising one or more additional flexible seat sensors disposed within the deformable distance from the seat surface.

12. The vehicle seat sensor system of claim 11, wherein:
the vehicle seat comprises a seat portion, a back support portion, and a leg support portion;
the seat surface extends across each of the seat portion, the back support portion, and the leg support portion;
the flexible seat sensor is positioned in the seat portion; and
the one or more additional flexible seat sensors include at least a first flexible seat sensor positioned in the back support portion and a second flexible seat sensor positioned in the leg support portion.

13. The vehicle seat sensor system of claim 1, wherein the vehicle seat comprises a land vehicle seat, an air travel vehicle seat, or a marine vehicle seat.

14. A method to make a flexible sensor, the method comprising:
removing one or more predetermined regions from a single starting sheet, a remainder portion of the starting sheet comprising a plurality of remainder regions having electrically conductive structures and a dielectric layer that extends continuously across the remainder regions, the electrically conductive structures all on a same side of the remainder portion of the starting sheet;
sequentially folding the remainder portion of the starting sheet to arrange the remainder regions in a stack in which each electrically conductive structure in a given remainder region is spaced apart from one or more other electrically conductive structures in one or more adjacent remainder regions of the stack by at least one of the dielectric layer in the given remainder region or the dielectric layer in the adjacent remainder region,
wherein the single starting sheet is rectangular with nine regions arranged in three rows of three regions each, the nine regions include first, second, third, and fourth corner regions, and removing the one or more predetermined regions comprises removing the first, second, and third corner regions.

15. The method of claim 14, further comprising electrically conductively coupling a first electrically conductive structure of a first remainder region to a second electrically conductive structure of a second remainder region.

16. The method of claim 15, wherein the sequentially folding comprises sequentially folding the remainder portion such that:

a third reminder region having a third electrically conductive structure is positioned between the first remainder region and the second remainder region;
the dielectric layer of at least the first or third remainder region is positioned between the first electrically conductive structure of the first remainder region and the third electrically conductive structure of the third remainder region; and
the dielectric layer of at least the second or third remainder region is positioned between the second electrically conductive structure of the second remainder region and the third electrically conductive structure of the third remainder region.

17. The method of claim 14, wherein each of the remainder regions has a footprint that is equal in size and shape to a desired footprint of the flexible seat sensor.

18. The method of claim 14, further comprising forming the electrically conductive structures on the dielectric layer to form the single starting sheet.

19. The method of claim 14, wherein:
the nine regions further include first, second, third, and fourth medial regions;
the first and fourth medial regions are positioned on adjacent sides of the fourth corner region; and
the method further comprises separating the fourth corner region from the first medial region along a first shared border between the fourth corner region and the first medial region while maintaining a connection of the fourth corner region to the fourth medial region along a second shared border between the fourth corner region and the fourth medial region.

20. The method of claim 19, wherein:
the nine regions further include a center region;
the remainder regions include the first, second, third, and fourth medial regions and the center region; and
sequentially folding the remainder portions comprises:
folding the first medial region onto the center region to form a first intermediate stack;
folding the third medial region onto the first intermediate stack to form a second intermediate stack;
folding the second medial region onto the second intermediate stack to form a third intermediate stack; and
folding the third intermediate stack onto the fourth medial region.

21. The method of claim 14, further comprising assembling the flexible sensor into a flexible sensor mat together with one or more additional flexible sensors and electrically coupling each flexible sensor to an electronics unit.

22. The method of claim 21, further comprising installing the flexible sensor mat in a vehicle seat with the flexible sensors positioned in different locations of the vehicle seat.

23. A method to determine sitting posture of an occupant of a vehicle seat, the method comprising:
charging flexible seat sensors of a vehicle seat sensor system with direct current, the flexible seat sensors positioned in different locations of a vehicle seat and within a deformable distance from a seat surface of the different locations of the vehicle seat, each of the flexible seat sensors comprising a capacitive sensor and including one or more signal electrodes, one or more ground electrodes, and one or more dielectric layers;
receiving occupancy data from each of the flexible seat sensors based on an amount of discharged charge of each flexible seat sensor; and analyzing the occupancy data from the flexible seat sensors to determine a seat posture of the occupant in the vehicle seat, wherein the one or more signal electrodes includes a first signal electrode;

the one or more ground electrodes includes first and second ground electrodes;

the one or more dielectric layers includes first and second dielectric layers positioned on opposite sides of the first signal electrode, the first and second ground electrodes are electrically coupled to each other, the flexible seat sensor further comprises at least one of; and a first insulating layer positioned on a surface of the first ground electrode opposite the first dielectric layer, or a second insulating layer positioned on a surface of the second ground electrode opposite the second dielectric layer.

24. The method of claim 23, further comprising conveying the determined seat posture to the occupant.

25. The method of claim 24, further comprising communicating a recommended change in seat posture to the occupant.

26. The method of claim 23, wherein the occupancy data comprises quantized capacitive discharge output from the flexible seat sensors, the quantized capacitive discharge of each flexible seat sensor proportional to an amount of compression, distention, and/or displacement experienced by the corresponding flexible seat sensor.

27. The method of claim 23, wherein the different locations of the vehicle seat comprise at least two of: a seat portion, a back support portion, a leg support portion, or an armrest portion.

28. The method of claim 23, wherein analyzing the occupancy data comprises comparing the occupancy data from the flexible seat sensors.

*    *    *    *    *